United States Patent
Facey et al.

(10) Patent No.: US 11,681,494 B2
(45) Date of Patent: *Jun. 20, 2023

(54) ADDING AUDIO CONTENT TO DIGITAL WORKS

(71) Applicant: AUDIOMOB LTD, London (GB)

(72) Inventors: Christian Facey, London (GB); Wilfrid Obeng-Boakye, London (GB)

(73) Assignee: AUDIOMOB LTD, London (GB)

( * ) Notice: Subject to any disclaimer, the term of this patent is extended or adjusted under 35 U.S.C. 154(b) by 27 days.

This patent is subject to a terminal disclaimer.

(21) Appl. No.: 17/477,965

(22) Filed: Sep. 17, 2021

(65) Prior Publication Data

US 2022/0004358 A1 Jan. 6, 2022

Related U.S. Application Data

(63) Continuation of application No. PCT/GB2021/051585, filed on Jun. 22, 2021.

(60) Provisional application No. 63/042,296, filed on Jun. 22, 2020.

(51) Int. Cl.
*G06F 3/16* (2006.01)
*G06Q 30/0242* (2023.01)
*A63F 13/61* (2014.01)

(52) U.S. Cl.
CPC .............. *G06F 3/165* (2013.01); *A63F 13/61* (2014.09); *G06Q 30/0242* (2013.01)

(58) Field of Classification Search
CPC ...................................................... G06F 3/165
See application file for complete search history.

(56) References Cited

U.S. PATENT DOCUMENTS

| | | | | |
|---|---|---|---|---|
| 8,527,345 | B2 * | 9/2013 | Rothschild | H04L 29/06 |
| | | | | 705/14.53 |
| 2007/0078706 | A1 * | 4/2007 | Datta | G06Q 30/0269 |
| | | | | 705/14.5 |
| 2007/0265073 | A1 | 11/2007 | Novi et al. | |
| 2008/0102947 | A1 * | 5/2008 | Hays | A63F 13/61 |
| | | | | 463/31 |

(Continued)

FOREIGN PATENT DOCUMENTS

JP 5399077 B2 1/2014

OTHER PUBLICATIONS

Quora, "How does Spotify's commercials pause when the volume is muted?" published on Jul. 23, 2014 https://www.quora.com/How-does-Spotifys-commercials-pause-when-the-volume-is-muted/answer/Diego-Planas-Rego/log (Year: 2014).*

(Continued)

*Primary Examiner* — James T Tsai
(74) *Attorney, Agent, or Firm* — Banner & Witcoff, Ltd.

(57) ABSTRACT

Method and system for playing audio on a device, the method comprising the steps of a component of a digital work initiating a request for audio data during a rendering of the digital work, the digital work including video data. In response to the request, receiving the audio data. While continuing the rendering of the digital work on the device, suspending playback of first audio data currently playing on the device and playing the received audio data on the device. When the received audio data stops playing continuing with the rendering of the digital work on the device and resuming playback of the first audio data previously playing on the device.

16 Claims, 17 Drawing Sheets

(56) References Cited

U.S. PATENT DOCUMENTS

| | | | |
|---|---|---|---|
| 2008/0207137 A1* | 8/2008 | Maharajh | H04W 4/18 |
| | | | 455/74 |
| 2009/0030774 A1* | 1/2009 | Rothschild | G06Q 30/0269 |
| | | | 705/14.1 |
| 2009/0037947 A1 | 2/2009 | Patil | |
| 2010/0122285 A1 | 5/2010 | Begeja et al. | |
| 2011/0126102 A1 | 5/2011 | Archer | |
| 2011/0289506 A1* | 11/2011 | Trivi | G06F 9/526 |
| | | | 718/104 |
| 2013/0064385 A1 | 3/2013 | Jeong et al. | |
| 2014/0109003 A1* | 4/2014 | Saib | G06F 3/0482 |
| | | | 715/808 |
| 2014/0169751 A1 | 6/2014 | Weast et al. | |
| 2014/0240595 A1* | 8/2014 | DiNunzio | H03G 3/04 |
| | | | 348/484 |
| 2014/0282652 A1* | 9/2014 | Monnerat | H04N 21/44224 |
| | | | 725/32 |
| 2014/0321671 A1* | 10/2014 | An | H03G 3/02 |
| | | | 381/109 |
| 2015/0310495 A1 | 10/2015 | Goldberg et al. | |
| 2016/0243450 A1 | 8/2016 | Cotter | |
| 2016/0309214 A1 | 10/2016 | Chung | |
| 2017/0109796 A1 | 4/2017 | Rahle et al. | |
| 2017/0289644 A1 | 10/2017 | Hensgen et al. | |
| 2017/0295410 A1* | 10/2017 | Bloch | H04N 21/812 |
| 2018/0165701 A1* | 6/2018 | Onda | A63F 13/79 |
| 2018/0181977 A1 | 6/2018 | Takei et al. | |
| 2019/0028746 A1 | 1/2019 | Inzerillo | |
| 2021/0281927 A1 | 9/2021 | Sanuelson | |

OTHER PUBLICATIONS

International Search Report and Written Opinion dated Sep. 17, 2021—PCT/GB2021/051585.

International Search Report and Written Opinion dated Mar. 23, 2022 in PCT/GB2021/051586.

* cited by examiner

| Event | Trigger |
|---|---|
| Audio Ad Started | events fires once the audio ad begins playing |
| 1st Quartile | event fires once the audio ad has reached 25% playback |
| 2nd Quartile (Mid-Point) | event fires once the audio ad has reached 50% playback |
| 3rd Quartile | event fires once the audio ad has reached 75% playback |
| 4th Quartile (Complete Listen) | event fires once the audio ad has reached 100% playback |
| Banner Ad Displayed | event fires when banner ad is displayed (if applicable) |
| Click-through | event fires if banner has been pressed |

Fig. 5

| SDK Parameters | Type | Description |
|---|---|---|
| Output | Audio Source | Audio source for AudioMob audio as |
| Companion Image | RawImage | Audio ad companion image sent by the advertiser |
| Size Controller | BannerSizeController | Controls the size of the companion banner (preset dropdown) |
| User Prompt Panel | Canvas | Canvas for your message encouraging the user to unmute (if muted) |

Fig. 7

ADDING AUDIO CONTENT TO DIGITAL WORKS

CROSS-REFERENCE TO RELATED APPLICATIONS

This application claims priority to and is a Continuation of PCT International Application PCT/GB2021/051585, filed Jun. 22, 2021, which claims the benefit of priority to U.S. Provisional Application No. 63/042,296, filed Jun. 22, 2020. All benefits of these earlier filed application are hereby claimed, and each is hereby incorporated by reference in its entirety.

BACKGROUND

Digital content may be consumed on devices in different ways. Digital content, including multiple formats such as audio, video and interactive content, often competes for a user's attention. Switching between digital content on a device and especially mobile devices, can be cumbersome and there can be barriers for a user to consume different digital content at the same time even if the user wishes to do so.

For example, a user may wish to play an interactive game on their device whilst listening to music from a different application. It can be difficult to manage such a transition, especially when the interactive game includes its own audio content that may interfere with the user's listening experience.

Digital content such as games and other applications, can include functionality to present at intervals, other digital content such as video content, instructional content during game play and content from external sources (e.g. live broadcast feeds, bulletins, and advertisements). It can be difficult to coordinate the presentation of separate digital content to a user during game-play, in particular, without affecting the game play functionality, user interaction or game flow, especially on small or mobile devices with limited resources and small display screens.

Therefore, there is required a method and system that overcomes these difficulties.

SUMMARY

A digital work, such as a game or application, includes a component, such as a plugin, that coordinates or generates requests for audio data whilst the digital work is being presented to a user. The request may not be for particular audio data but may instead indicate a suitable time to play to a user such alternative audio data selected elsewhere. This can occur during user interactions, for example when playing a game and the component can be called, be embedded within, or operate alongside such an application. The component operates within the same device that renders the digital work and plays back the audio data.

The device receives audio data in response to the request generated by the component. The component controls (or is used to define other components to control) the playback or rendering of the digital work by continuing to display its video content and any user interaction but replacing the audio that is included in the digital work (or other audio data being played on the device) with the received audio data. The received audio data continues to play until it is either complete or has been stopped part way through its playback, perhaps by user interaction or selection, at which point whatever audio had been previously playing on the device resumes, preferably where it left off (e.g. for a music track). However, if the original audio was context-specific (e.g. sound effects within a game or application), then the original audio can continue with the present context. The originally playing audio could be part of the digital work (e.g. game audio) or may have originated from a separate app playing in the background such as a radio station or audio track selected by the user, for example.

Therefore, the user can continue interacting with the digital work on a visual and interactive level with separate audio content temporarily being played back to them in a way that does not distract them from the digital work but in an automated and coordinated manner, reducing distractions and improving the user/computer interface. This is especially useful in avoiding user disruption, for example. The combination of received audio content being presented or rendered with video content of a digital work at the same time is particular advantageous, especially with interactive content like games, as audio can be swapped in and out without disrupting user interaction significantly.

In accordance with a first aspect, there is provided a method for playing audio on a device, the method comprising the steps of:

a component of a digital work initiating a request for audio data during a rendering of the digital work, the digital work including video data;

in response to the request, receiving the audio data;

while continuing the rendering of the digital work on the device, suspending playback of first audio data currently playing on the device and playing the received audio data on the device; and when the received audio data stops playing continuing with the rendering of the digital work on the device and resuming playback of the first audio data previously playing on the device. Therefore, users may continue to interact with digital content whilst being temporarily supplied with additional content or supplemental content (audio) in a seamless manner and without disrupting user interaction with the current application.

Preferably, the digital work may be an interactive digital work. However, the digital work may be only video or video and audio content.

Optionally, the interactive digital work may be a game, mobile application, or web page. Other types of digital work may be used or incorporate the component in various forms.

Advantageously, the method may further comprise the step of:

following playback of the received audio data, changing one or more parameters within the interactive digital work. Therefore, otherwise independent content may have a direct or indirect interaction with the digital work. For example, fully playing the audio content may indicate that a user has listened to instructional content and can continue to a different or next section of the digital work. Alternatively, fully playing (or playing up to a predetermined point) an audio advertisement may unlock a feature or features of the digital work (e.g. a mobile app or game) such as providing an additional life, in-game coins, in-app privileges, and/or additional equipment or character attire, for example.

Optionally, the one or more parameters may alter a user interaction with the interactive digital work.

Optionally, the first audio data may be audio data of the digital work or audio data generated by a separate application. Whilst the first or initial audio data may be audio data that is part of the digital work (e.g. an audio track of a video or game sound), the first audio may be provided by another application or function of the device (e.g. a mobile device)

on which the method executes. This other application may be a music, streaming or podcast provider (or another source of audio), for example.

Preferably, the component of the digital work initiating the request may be a software plugin. For example, this may be the Unity plugin or a similar item of add-on code.

Optionally, the method may further comprise the steps of:
detecting a current device volume output level; and
if the detected volume output level is below a predetermined threshold then carrying out one or more actions. As it is audio that is being received, then it may be advantageous to ensure that the device (e.g. a mobile device such as a smartphone) is set to provide audio at an audio level high enough to be heard by the user. This may be by internal speakers or headphones, if connected.

Optionally, the one or more actions may include: issuing a user prompt to increase the volume output level; increasing the volume output level to a predetermined threshold; and/or preventing playback of the audio data until the device volume output level is at or above the predetermined threshold. The actions may also include delaying the playback of the received audio until the volume is at or above a predetermined threshold, for example.

Optionally, the method may further comprise the steps of:
receiving a user command to stop playback of the received user data; and
in response resuming playback of the audio data of the digital work in place of the received audio data. Therefore, the original audio continues automatically whether or not the received audio data has completed playback.

Optionally, the method may further comprise the steps of:
monitoring how much of the audio data has been played back; and
reporting the monitored playback amount. Therefore, external monitoring may be maintained regarding how much and what audio has been played back on different devices. This information can be used to select audio for sending to devices or determining any predetermined requirements for playback of particular audio data are met.

Advantageously, the component may carry out the monitoring and reporting steps. Therefore, this can simplify the processing of the information and set up of the functionality.

Preferably, the audio data may be received from a server. The audio data may be received from different sources or servers even for the same device and/or digital work.

Optionally, the method may further comprise the steps of:
the server receiving the request for audio data;
the server preparing a further request based on request parameters;
the server issuing the further request and receiving in response the audio data; and
the server sending the audio data to the mobile device. This process can be used to send different audio data to different device or to the same device at different times.

Optionally, the method may further comprise the steps of:
the device receiving visual data with the audio data; and
displaying on a display of the device, the visual data together with the video data of the digital work. For example, this may be a visual indication of the name or source of the audio data or an advertisement banner, for example.

Optionally, the visual data may include user interaction functionality. For example, the user may click on the visual data or otherwise select or activate it. This may result in the user being directed to a website or other location, for example.

Preferably, the method may further comprise the step of sending a report of user interaction with the visual data user interaction functionality. This can be sent to the source of the audio data (or other location or entity) for monitoring or other purposes.

According to a second aspect, there is provided a device or mobile device comprising:
a display; and
means adapted to execute the steps of any method described above.

According to a third aspect, there is provided a system comprising:
a server and the device or mobile device described above.

According to a further aspect, there is provided a system and for creating and customising the component, creating the digital work and/or selecting the audio data to be sent to the device in response to the request from the component.

The methods described above may be implemented as a computer program comprising program instructions to operate a computer. The computer program may be stored on a computer-readable medium.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 5 shows examples of SDK events trackers provided by the system for advertisers or other audio content providers and/or demand-side platform (DSP).

FIG. 7 shows examples of SDK parameters, parameter types, and descriptions.

DETAILED DESCRIPTION

Figure 1:
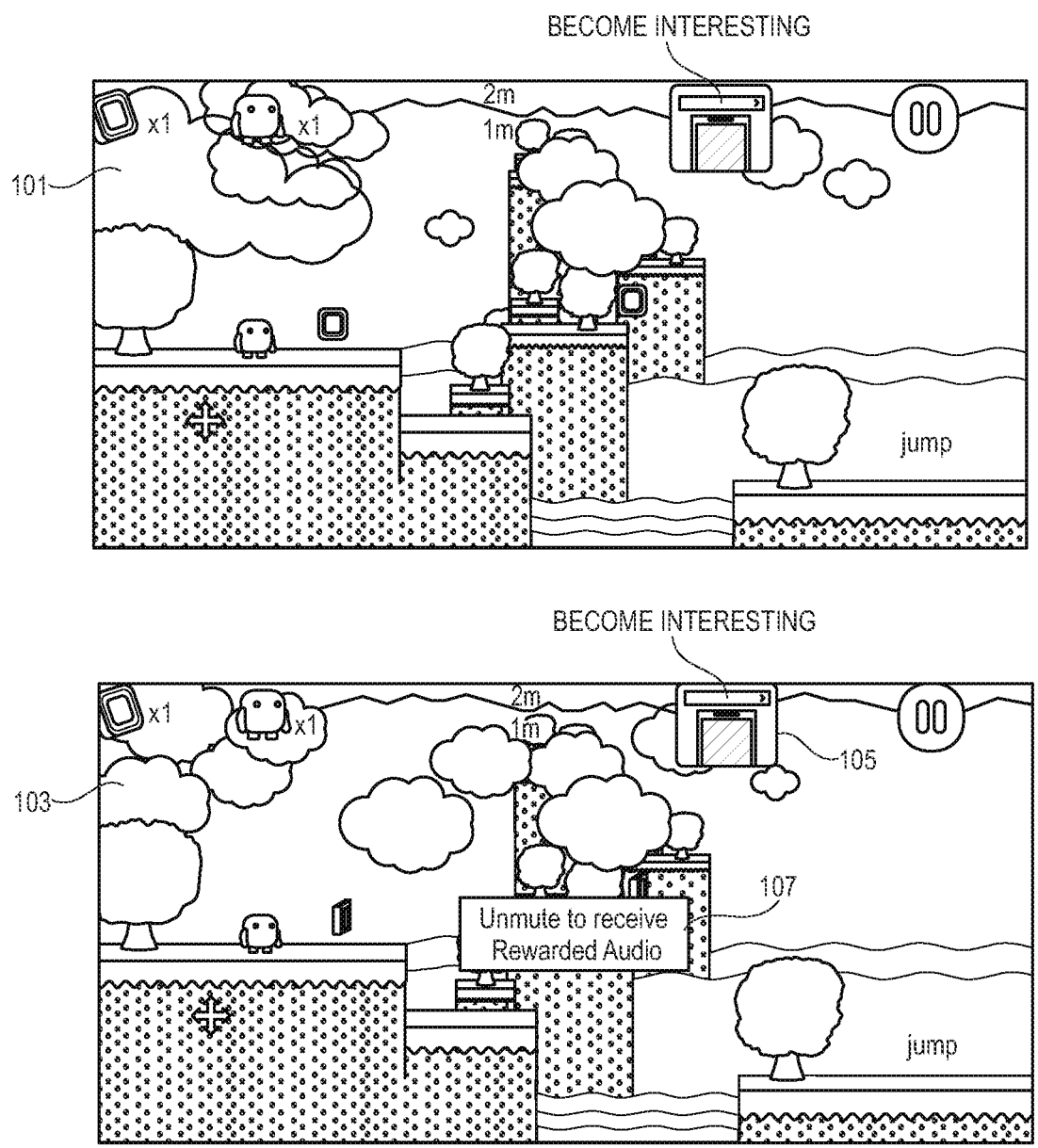
FIG. 1 shows an example of rewarded audio advertisement or other audio data offered in a video game.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Certain Definitions

Unless otherwise defined, all technical terms used herein have the same meaning as commonly understood by one of ordinary skill in the art to which this invention belongs.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," "unit" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The term "impressions" as utilized herein, may generally refer to countable event relating to consumption of a given media asset which can be used for a variety of purposes, including for example determining the efficacy or penetration of advertisement content, assessing user interest in a product/service, and as a basis for charging advertisers for placement of their advertising content. These impressions may utilize data on a statistical or anecdotal basis; for example, impression data may be correlated to users on an individual basis (e.g., to determine whether User A actually listened to or interacted with Advertisement X), or alternatively may be drawn across a broader pool (e.g., via a statistical distribution of user interaction or listening to advertisements in association with a video game or media stream).

In one aspect, the present disclosure provides methods and systems for creating and ingesting non-interrupting advertisement or other audio content into a digital work such as a video media asset/content (e.g., video game, movie, etc.), and delivering the advertisements or other audio content in a non-intrusive manner. The examples provided describe video games but any digital work may be used. For example, the audio (e.g. advertisement) may be inserted to a video mobile game via the provided platform and the audio advertisement may be played to a user (e.g., game player) without interrupting the gameplay. When players transition from in-game content to the audio advertisements, their in-game experience may not be affected, and the audio advertisements are delivered in a way that it doesn't distract the user from a game which increases the loyalty of the audience to the format.

In some embodiments, the audio can be generated and delivered in a standard format or a rewarded format. In some cases, the standard format may allow users to skip the particular received audio after several seconds using a skip button. The rewarded audio advertisement may incentivize users (e.g., mobile game players) to voluntarily listen to an audio advertisement in exchange for the in-game treat (e.g., extra lives, coins, daily rewards, closed content, etc.). For example, after listening to the short audio advertisement, the user may obtain access to the valuable in-game bonuses. The rewards offered to the users may be designed to target the video game content or gamers that could range from the extra life/round in-game to the little daily bonuses as coins or hints which help the gamers to walk through the game if they got stuck. In some cases, the rewarded format can be adjusted to suit the specific game triggered by the user, and may be adjusted automatically to better target the user or the game. Such audio advertisements may beneficially engage users without distracting users from game or disrupting in-game progress thereby providing higher user retention and satisfaction compared to visual advertisements.

FIG. 1 shows an example of a rewarded audio advertisement offered in a video game. As shown in the example, in the middle of a game 101, a user may be prompted to listen to a rewarded audio advertisement in exchange for the in-game treat as described above. In some cases, when the system audio level (e.g., low or zero volume) is detected to be muted, the user may be prompted to unmute or raise the volume level to receive the rewarded audio ads. For instance, a visual message 107 may be displayed prompting the user to select to listen to the rewarded audio ad. A user may choose to listen to the audio ad or ignore it. In some cases, a companion banner 105 may be displayed to add visual engagement to the audio experience. The banner 105 (e.g. an overlaid interactive image) may take a user to a page defined by an advertiser (e.g., product page). The banner may be placed in a non-interrupting location (e.g., top, bottom or corner) that does not block essential objects of the video game. The term "companion ad" or "companion banner" as utilized herein may refer to static banners containing logo and call-to-action (CTA) overlay which can be available for clicking upon while the audio playback is in progress. In some cases, the companion ad may be displayed on one or more game objects.

The non-interrupting advertisements can be provided to any video or digital asset. In some embodiments, the digital content, video content or video media asset may be a video game (e.g., computer games, mobile games, arcade games, console games, etc.) or other application. The digital content, video content or video media asset may include any other types of content such as movie, network media and the like.

Figure 2:
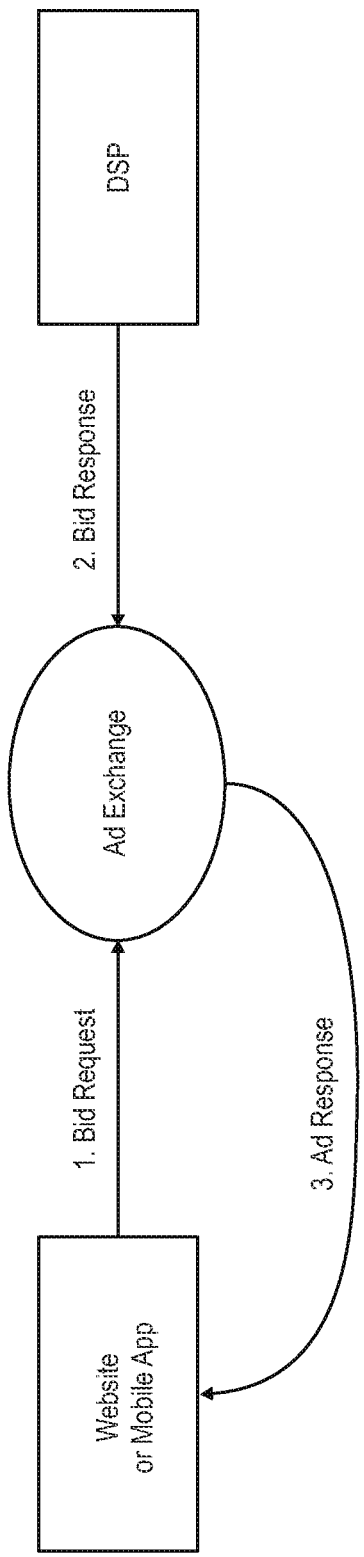
FIG. 2 schematically illustrates a programmatic advertising process for delivering an audio advertisement or other audio data.

An audio advertisement or other audio content can be delivered to a mobile device or video content (e.g., video game) via an online advertising process such as programmatic advertising. FIG. 2 schematically illustrates a programmatic advertising process for delivering an audio advertisement. The programmatic advertising is an automated digital ads transaction process connecting advertisers to publishers to deliver ads to the right person, at the right time, in the right place. As shown in the exemplary process, when a user opens a website or mobile application, a bid request may be generated which requests an advertisement from an Ad exchange. An Ad exchange may refer to a platform that facilitates buying and selling of advertising space from websites and apps. Prices for the inventory are determined through automated auction-based marketplaces.

Advertisers may run ad campaigns through the Demand Side Platform (DSP) in response to the bid request. The Ad Exchange may run an auction to determine the highest bidding advertiser and send the winning ad to the website or mobile app as an Ad response.

Unity Plugin-Based Integration Method and System

The following example describes the audio being an audio advertisement but may take other forms, such as a news broadcast, an audio track (e.g. music or audio book) or instructional audio, for example. In any case, the audio content can be seamlessly integrated into existing platforms e.g., third-party game development platforms such Unreal Engine, Cocos2d and Amazon Lumberyard, via a customized Software Development Kit (SDK) or application programming interfaces, (APIs). In some embodiments, the audio advertisements can be inserted into video games developed by a game development software such as the Unity engine via a customized audio advertising SDK. The Unity engine is used by developers to create three-dimensional, two-dimensional, virtual reality, augmented reality games, as well as simulations, applications and other experiences. The Unity engine has also been adopted by industries outside video gaming, such as film, automotive, architecture, engineering and construction. The provided audio advertising SDK integration system may allow game developers to integrate the audio advertising SDK into their games conveniently, provide components allowing the game developers to design the audio advertisements (e.g., select rewarded audio trigger, sound output, companion banner object, unmute prompt, etc.) concurrent with game development within the Unity Engine. The Unity engine can be used in conjunction with a Unity plugin (i.e. a component within the digital work) that allows users to implement audio advertising features into their games. It should be noted that any description about the audio advertising SDK provided herein can be applied to the Unity plugin or component throughout the specification.

It should be noted that although the SDK and integration method as described herein are presented in the context of Unity engine, the methods and systems as described herein can be used to provide the non-interrupting audio to any existing third-party game (or other) development platform or development systems.

Figure 3:
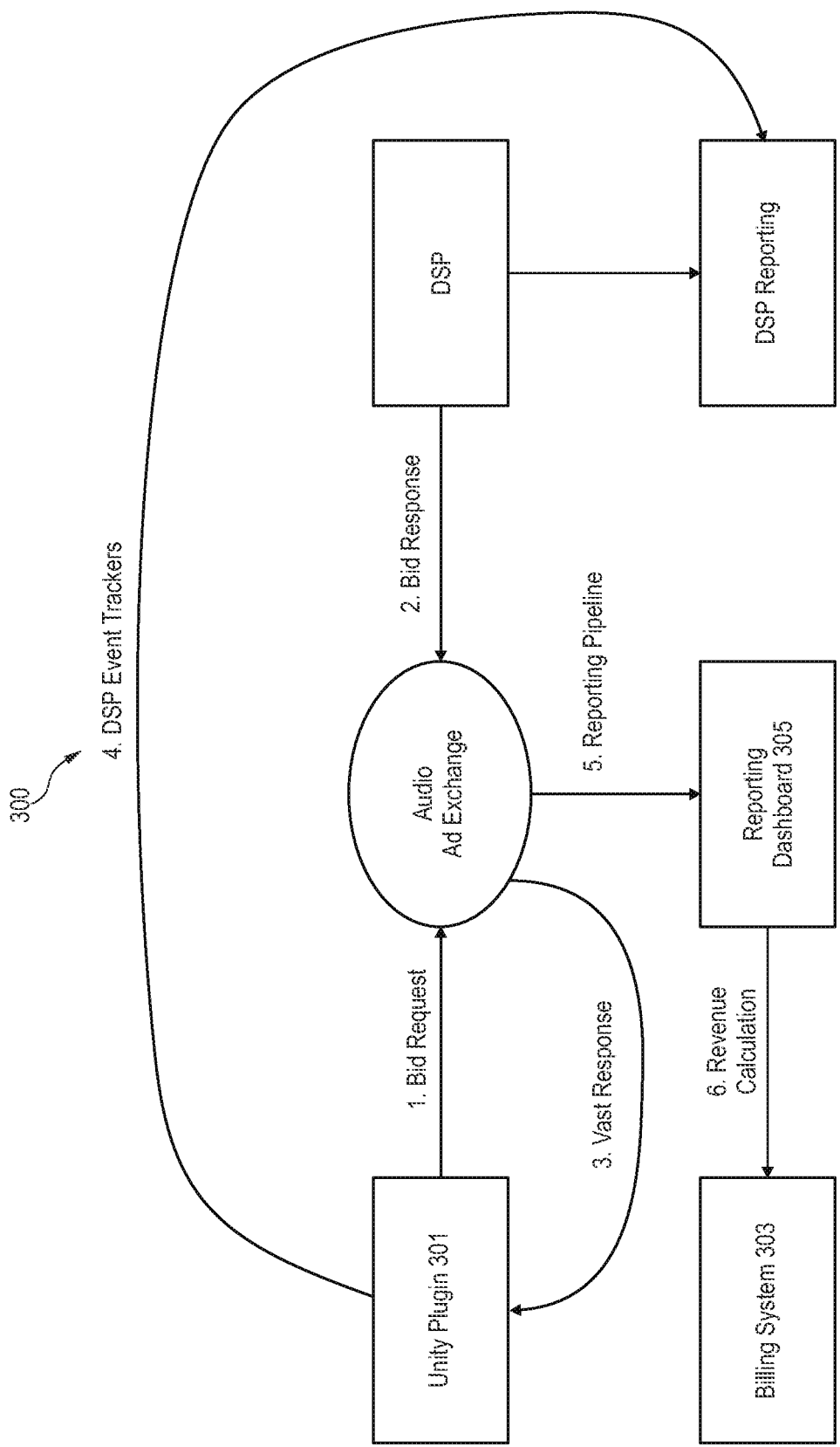
FIG. 3 schematically illustrates an exemplary diagram flow of integrating and delivering non-interrupting advertisements or other audio data in a video content/media asset via an audio advertising system, in accordance with some embodiments of the present disclosure.

FIG. 3 schematically illustrates an exemplary diagram flow 300 of integrating and delivering non-interrupting advertisements in a video content/media asset via an audio advertising system, in accordance with some embodiments of the present disclosure. As described above, the audio advertising system may include a Unity engine. In some embodiments, the Unity engine may be used in conjunction with a Unity plugin that allows users to implement audio advertising features into their games.

The provided Unity plugin may provide various features for providing non-interrupting advertising experience or other audio content during gameplay. In some cases, the Unity plugin may include an automatic volume detection feature such that volume at the operating system level can be detected allowing the audio advertising system to deliver the audio ad based on the detected audio level or trigger one or more actions (e.g., prompting user to unmute). For instance, an audio advertisement may be played at an audio level that is the same as a detected operating system audio level. In some cases, when the operating system level is detected to be muted or below a predetermined threshold, a visual notification may be displayed prompting a user that an audio ad (or other audio content) is available. The Unity plugin may provide audibility measurement capability such that volume change or audibility can be detected.

In some cases, the Unity plugin may have an audio passback feature. For instance, when an audio ad is triggered/played, the Unity plug in may automatically pause the background app audio (e.g., Spotify, game) at the current playback point, and return to background app audio when the audio ad is complete. As an example, in a gameplay, when an audio ad is played, the video game may continue without interruption whereas the audio of the game may be muted or the volume may be decreased.

In some cases, the Unity plugin may have an unmute prompt feature. For example, during the play of an audio ad, if the operation system volume is detected to be below a threshold, e.g., 20%, 30%, etc. a user may receive a visual prompt encouraging the user to tune up the volume or unmute.

In some cases, the Unity plugin may be capable of tracking events. For example, the Unity Plugin may track audio ad impressions, quartiles (e.g. 0%, 25%, 50%, 75%, 100%), length of time that the audio was played for (e.g. absolute, percentage, milestone, etc.), banner impressions and banner click-throughs or other events. This may provide advertisers or other audio suppliers with a rich reporting data and engagement statistics. In some cases, the Unity plugin may also provide companion banner.

As shown in FIG. 3, the Unity plugin 301 may send a bid request, such as a universal resource locator (URL) request containing a plurality of targeting parameters, to an Audio Ad exchange or other server. The targeting parameters may include, but not limited to, a device identification in Identity for Advertisers (IDFA) or ADID format, a location in latitude and longitude format, a game genre/category in IAB game genre/category identification format, an audio position in string format, a banner size in pixel dimensions, a store identification in string format, a store URL in string format, a Bundle identification in reverse DNS format, an interest in string format, regulations such as Children's Online Privacy Protection Act, California Consumer Privacy Act, General Data Protection Regulation and various others.

It should be noted that it is not essential that audio data is supplied based on bidding (or payment) for device playback. The audio data may be supplied for purposes other than for advertising. For example, users may request different audio tracks to be sent to them and played seamlessly whilst they interact with applications or games on their devices. This may be provided as part of a service (e.g. a subscription service) or as related training or instruction. For example, this may be specific to the application or game with which they are currently interacting. Therefore, the request for audio data may also include additional information regarding the user and how they are operating their device and what application(s) they are using. This can improve the relevance of the audio data sent at any particular time.

In some embodiments, at least one of the device identification, the location, the game genre, the audio position, the banner size, the store identification, the store URL, the bundle identification, and the interest are automatically retrieved from Unity engine without developer or user input. In some embodiments, at least one of the device identification, the location, the game genre, the audio position, the banner size, the store identification, the store URL, the bundle identification, and the interest requires developer input within the Unity (or other) SDK. In some embodiments, at least one of the device identification, the location, the game genre, the audio position, the banner size, the store identification, the store URL, the bundle identification, and the interest are derived from demand-side platform (DSP) first party, a third party data package, (e.g. Google Audiences), or both. In some embodiments, at least one of the age, the gender, and the interests are derived from the device identification. In some cases, the privacy regulations and requirements may be provided by the developers.

The DSP may respond to the bid request if the DSP has campaigns matching the targeting parameters. Next, the Ad Exchange may send back a Video Ad Serving Template (VAST) response comprising the audio ad and the tracking events.

When the audio advertisement (or other audio data) is played, the tracked events are detected and reported at the corresponding event triggers. The reporting dashboard 305 may track and report the advertisement performance data (e.g. using data sent back by the plugin or component within the digital works). The billing system 303 may then calculate the game developer payouts based on the performance data and report.

Figure 4:
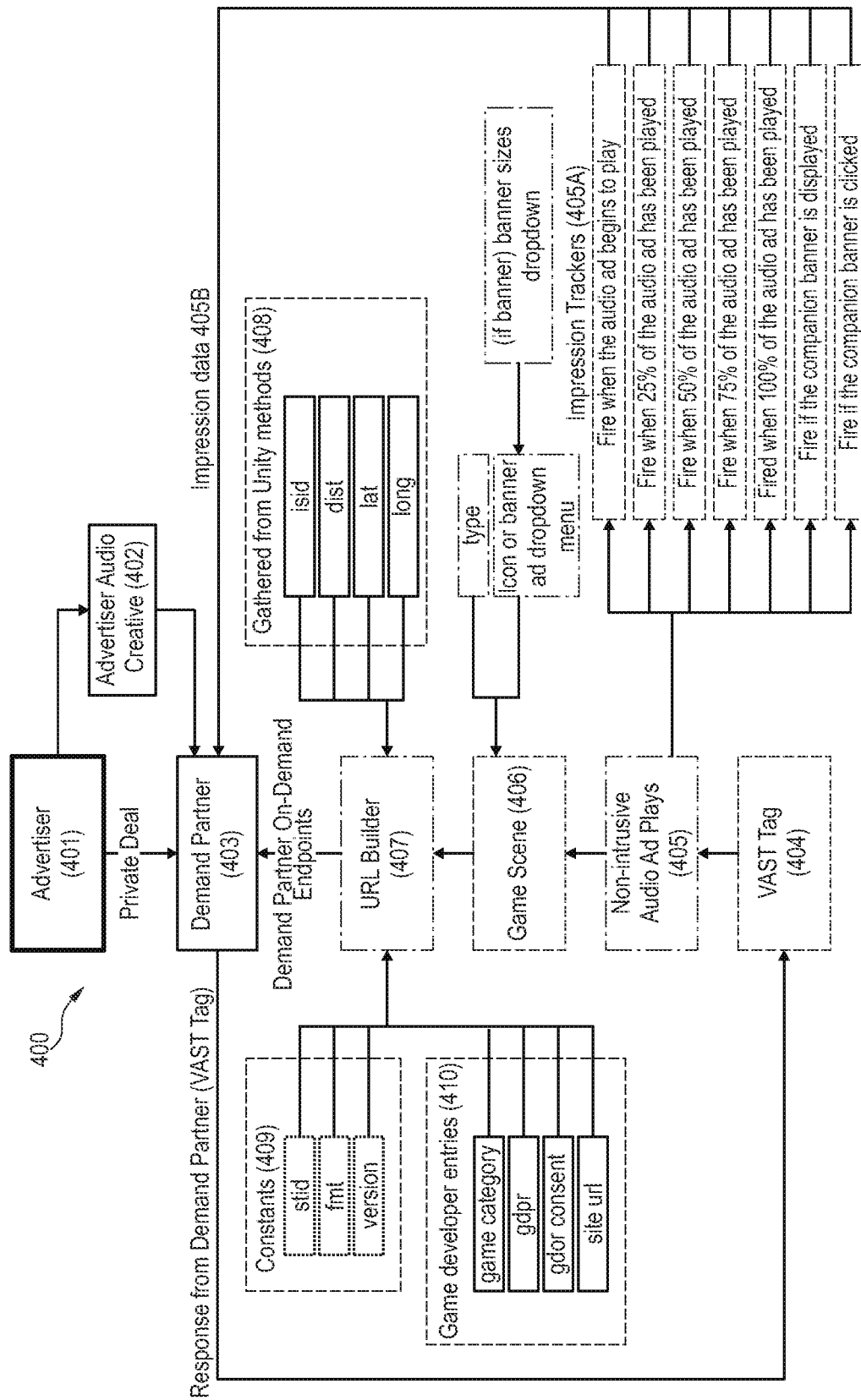
FIG. 4 shows another exemplary diagram flow of integrating and delivering non-interrupting advertisements or other audio data in a video content/media asset via an audio advertising system, in accordance with some embodiments of the present disclosure.

FIG. 4 shows another exemplary diagram flow 400 of integrating and delivering non-interrupting advertisements in a video content/media asset via an audio advertising system, in accordance with some embodiments of the present disclosure. The audio advertising system may include an On-Demand Advertising API requesting audio advertisement files upon receiving the target signals such as device ID, location and app category as described above. The audio advertisement files returned may include, but not limited to, an audio file (e.g., MP3, WAV, WMA, or OGG format), an image for companion ad (e.g., GIF, JPEG, PNG, HTML, JavaScript, etc.), other data (e.g., metadata such as title, description, etc.), event trackers (e.g. additional code), click through URL, or one or more interactive elements for rendering the non-intrusive advertisement or other audio data. The On-Demand Advertising API may interface with the audio advertising Software Development Kit (SDK) of the present disclosure to enable users to make audio ad calls within video assets (e.g., games).

The audio advertisement may be created and provided using the Software Development Kit (SDK) of the present disclosure. In some embodiments, the provided audio advertising SDK or audio advertising system may comprise a plurality of components to facilitate seamless integration of non-intrusive advertisements to the video game.

As shown in the figure, the audio advertisement system may comprise an Ad exchange 403 (Demand Partner) configured to receive a bid request generated by the URL builder 407. The URL builder may generate a URL containing a plurality of target parameters as described elsewhere herein. The Demand Partner 403 may receive a private deal (e.g., advertising campaign) and an audio creative (or any audio data) 402 from an advertiser 401 or other entity (e.g., advertiser server, news source, etc.) in response to the bid request. The Demand Partner 403 may be an audio Ad exchange as described above. The private deal may include data about an advertising campaign such as a start date, an end date, budget information, targeting information, syndication information and the like about one or more groups of one or more advertisements. Any suitable deal types can be enabled by the provided platform. For example, the various deal types of include open auction, private auction, preferred deal, programmatic guaranteed deal and various others. Open auction may also be referred to as real-time bidding (RTB) in which inventory prices are decided in real-time through an open auction that any publisher or advertiser may participate. In an open auction, publishers may make the media inventory available in the Ad exchange at a specific minimum cost per thousand (CPM) price and advertisers may bid for the available media they desire and the highest bidder wins the impressions. In a private auction, a selected/exclusive group of advertisers may have priority to bid on the media inventory. In some cases, publishers may approve or permit selected advertisers to apply for an invitation to participate in the private auction. In preferred deal, a buyer may buy inventory directly from a publisher via the Ad exchange without auction. The deal may be transacted in real-time and advertisers may win the impressions by bidding at or above a fixed CPRM price set by the publishers. In a programmatic guaranteed deal, a buyer may buy inventory from one publisher without the auctions and the buyer may agree to buy a fixed number of impressions at a price guaranteed by the publisher. The provided audio advertising system may be capable of mapping the various different deal types to a given bundle id via Custom Targeting Tags (TTags).

The audio creative 402 may include any object that contains all the data for rendering the audio advertisement. The audio creative is returned to the demand partner (e.g., On-Demand API) in response to the bid request. As described above, the object may be an audio file (e.g., MP3, WAV, WMA, or OGG format), an image for companion ad (e.g., GIF, JPEG, PNG, HTML, JavaScript, etc.), other data (e.g., metadata such as title, description, etc.) or interactive element for rendering the non-intrusive advertisement. The audio files may also include event trackers and click through URL.

For example, event trackers may include any one or more of:
Impression: fires when the audio ad begins playing;
1st Quartile: fires when the audio ad has reached 25% playback;
2nd Quartile: fires when the audio ad has reached 50% playback;
3rd Quartile: fires when the audio ad has reached 75% playback;
4th Quartile: fires when the audio ad has reached 100% playback;
Click-through: fires if the banner (e.g. an interactive visual data element) has been pressed;
Mute: fires when the user mutes their audio; and
Unmute: fires when the user unmutes their audio.

The private deal data and/or the audio creative may be submitted from an advertiser (e.g., advertiser server) to the audio advertising system prior to or at the time a game developer inserting the advertisements into a video game using the audio advertising SDK. For instance, a game developer may install the audio advertising SDK, attach a plurality of SDK parameters to a plurality of game objects, compile the game and upload the game to a publisher or game marketplace (e.g., Google Play Store or Apple App Store). In some embodiments, the audio advertising SDK may provide a graphical user interface (GUI) allowing game developers to insert the advertisements into a video game. For instance, a game developer may be permitted to modify a plurality of parameters such as rewarded audio trigger (e.g., attach parameters of game objects), sound output, companion banner object, unmute prompt and the like via the GUI. Details about inserting audio advertisements (or other audio content) to a video game is described later herein.

A user (e.g., game player) may download the video game for play on the user device. The user may receive one or more audio advertisements or other audio data during the gameplay. In some cases, a bid or other request for an audio advertisement or other audio data may be triggered by targeting signals such as device ID, location and app category collected by the audio advertising SDK 408. In some cases, the targeting signals along with other parameters such as constants 409, game developer entries 410 may be transmitted to the URL builder 407 for adding these parameters to a campaign URL. A shown in the example, the parameters 408 may include, for example, isid, dist, lat, and long, the constants 409 may include, for example, stid, fmt, and version constants 409 and the game developer entries 410 may include a game category, a gdpr, a gdor consent and a site URL. In some embodiments, the URL builder 407 may generate the URL containing the aforementioned parameters and transmit the URL request to the Ad exchange 403 via a Demand Partner on-demand endpoint.

In some embodiments, the audio advertisements may be in a rewarded audio advertisement format (e.g., non-skippable, non-interrupting), and when the user triggers a rewarded audio ads event predefined by the game developer, a bid request along with a plurality of SDK signals (e.g., targeting signals) may be generated and transmitted to the Demand Partner.

In some embodiments, an audio level of the user device (e.g., system volume of a computer device or mobile device) may be detected by the audio advertising SDK before the bid request is sent. For example, the audio advertising SDK provided herein may be the Unity plugin (e.g., iOS plugin or android plugin) that may detect the system audio level before sending the bid request. In some cases, the detected audio level may trigger one or more actions predefined by the game developer. For instance, if a mute system audio level (e.g., zero or low volume) is detected, the user may be prompted to unmute to receive the reward audio ads. For example, a user may receive a visual notification on the screen prompting the user a rewarded audio ad is available. As described above, the reward audio trigger, the audio advertisement, the companion ad, or any combination thereof may be set by the game developer within the audio advertising SDK.

Upon receiving the bid request, the Demand Partner 403 or Ad exchange may send a response including the relevant VAST (Video Ad Serving Template) tag 404 including the audio ad and the tacking events. The VAST tag 404 conforms to VAST protocol that defines the procedure of placement for linear audio ads (appear before, after or at the middle of audio content consumption), allowing an advertiser or game developer to select advertisements for placement in the video content (e.g., video game). Other protocols may be used. The relevant VAST tag may indicate the placement preference which may include a presentation preference of an advertisement relative to the presentation of the video content such as audio advertisement only or audio ad and companion banner. In some cases, the VAST tag may include audio file, companion banner and/or one or more impression trackers 405A. The relevant VAST tag may also include a plurality of impression trackers 405A comprising information about what event is counted as an impression, trigger of an event or definitions of events.

As shown, the impression tracker and event trackers 405A may comprise definitions of events and trigger of the events. For example, an Audio Ad Started event may be fired when the audio ad begins to play and a $1^{st}$ quartile event may be fired when 25% of the audio ad (or other audio data) has been played.

Figure 4A:
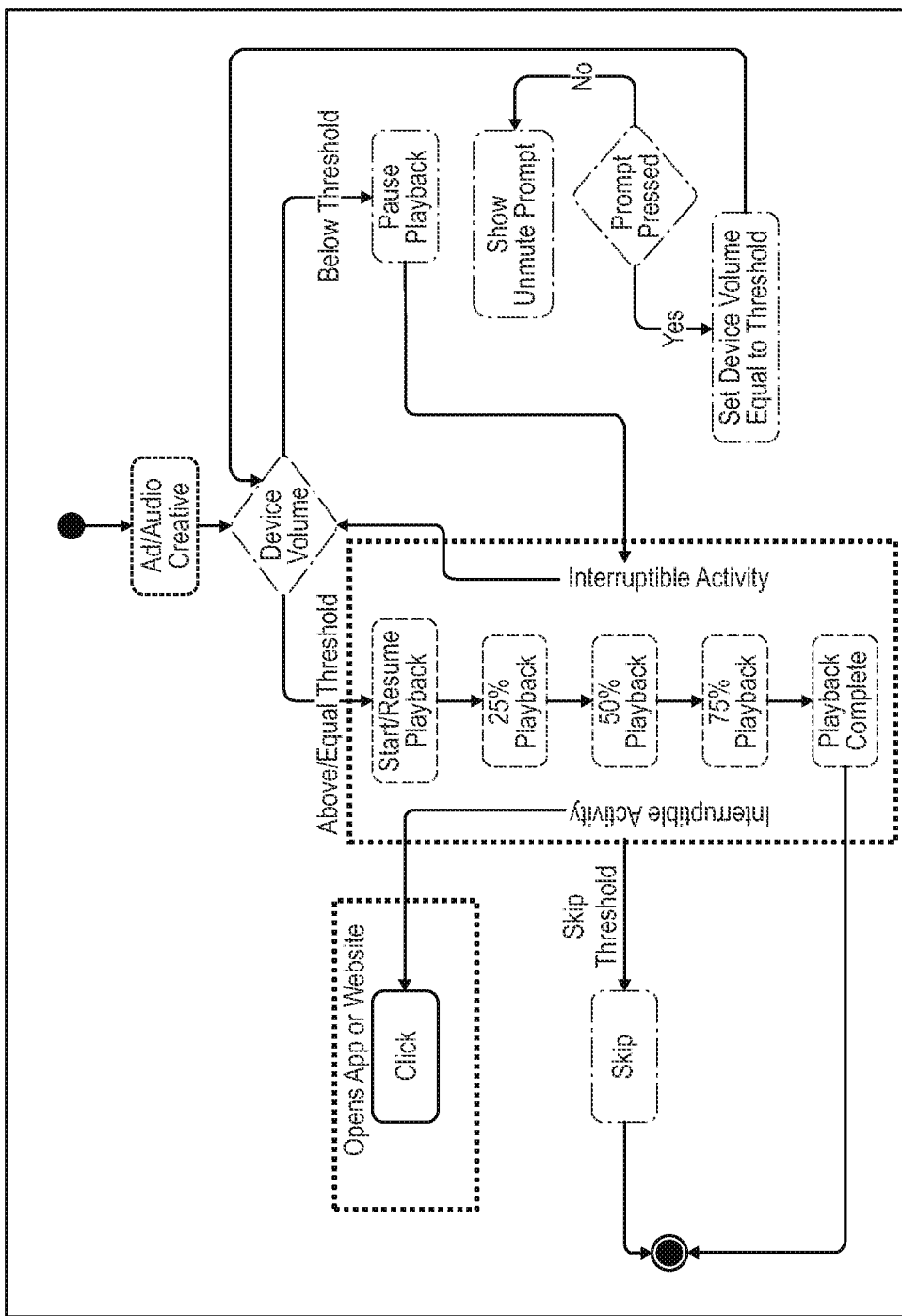
FIG. 4A shows a schematic state diagram of a system, including a component, for requesting, providing and monitoring audio data.

FIG. 4A shows a state diagram of the process for detecting playback volume carried out by the component (e.g. plugin or Unity plugin) embedded within the digital work (e.g. mobile application or game) and that may be implemented by the Unity plugin functionality, for example.

This diagram indicates the processes that take place after the audio data has been provided in response to a request (from the component) and the component or plugin detects the volume of any audio playing on the device or an audio level currently set whether or not audio is playing. If the volume level is below a predetermined threshold then playback of any current audio being played on the device is paused and an unmute prompt is displayed to the user. This detection may be made using an API or other interface with the operating system of the device. This prompt may be interactive and so if the user selects or presses on the prompt then the device volume is then set at or above the threshold. Preferably, the prompt is displayed until the user selects it. Alternatively, the prompt may be dismissed and the audio content is not played (or an attempt is made to play it later).

If the device volume is at or above the predetermined threshold then the received audio data is played (or its playback is resumed) in place of any audio that was currently being played by the device. The component (e.g. Unity plugin) starts to monitor how much of the audio data has been played back. This may be in absolute time, absolute percentage and/or reaching particular quartile milestones as indicated in FIG. 4A. The user may be presented with an option to skip or stop the playback of the received audio data and this skipping action may be detected and reported back to a server that monitors the playback events. If no skip is received and the playback of the audio data completes, then again this may be reported back to the server.

Accompanying the audio data that is received by the device may be an interactive visual element or banner. Again, should the user click or select this interactive visual element then the user may be directed to a further application or website (e.g. launching a browser on the device). Again, this may be reported back to the server.

Figure 4B:
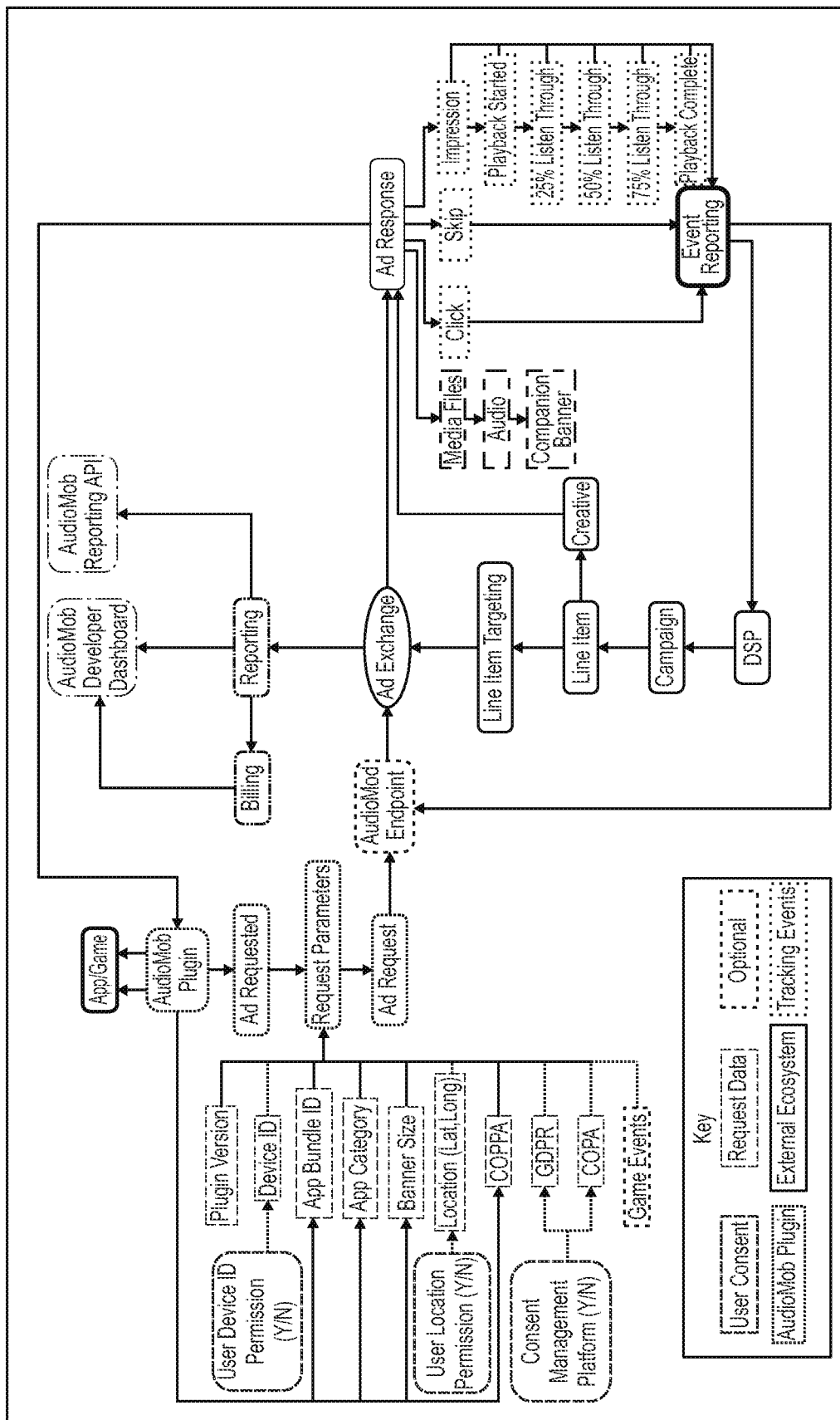
FIG. 4B shows a schematic diagram of a system, including a component, for requesting, providing and monitoring audio data.

FIG. 4B shows a schematic diagram of functionality that may be included within the Unity or other plugin or component. The mobile application, game or other digital work includes the component or plugin that requests audio data or indicates that audio data may be received. The request may be accompanied by request parameters that may be gathered from the device or other data. Example parameters are shown in FIG. 4A. The request is then sent to an external server or endpoint (e.g. AudioMob Endpoint) including the request parameters. This figure includes various example parameters that may be included and that may be determined from user requested permission and other privacy settings, for example. Some of these parameters may also include technical requirements such as determining the size of any accompanying banner or visual accompanying data. Additionally, the request parameters may include game events or other application-specific functionality enabling rewards or additional functionality for the application or game to be unlocked. The server or endpoint receives the request for audio data and can carry out more processing. For example, it may use these data to generate a further request that is used to obtain a specific item or category of audio data from external sources such as an ad exchange. The ad exchange receives this request and selects a particular item of audio data to serve to the device. In this example, the audio data is shown as a creative identified through an ad exchange.

FIG. 4B also shows the interactive responses provided by a user receiving the audio data and how they interact with any accompanying companion banner or visual data and how much of the audio data that was listened to before any skipping or closing event occurred. As described with reference to FIG. 4A, this information is returned to the component or plugin and ultimately reported to a central server for monitoring and billing if appropriate. Reports can be generated by an API and sent to a developer of the mobile application or game.

FIG. 5 shows examples of SDK events trackers provided by the system for advertisers and/or demand-side platform (DSP). As shown in the figure, the exemplary events and triggers may comprise: an audio ad started event which is triggered once the audio ad begins playing; a $1^{st}$ quartile event which is triggered once the audio ad has reached about 25% playback; a $2^{nd}$ quartile event which is triggered once the audio ad has reached about 50% playback; a $3^{rd}$ quartile event which is triggered once the audio ad has reached about 75% playback; a $4^{th}$ quartile event which is triggered once the audio ad has reached about 100% playback; a banner ad displayed event which is triggered if and when the banner ad is displayed; and a click-through event which triggers if and when the banner is pressed or clicked. In some embodiments, the events trackers may further include "Mute" event which is triggered when the system audio level is muted and "unmute" event which is triggered when a user unmutes the audio.

Referring back to FIG. 4, the VAST tags may be parsed by the audio advertising system and the non-interrupting audio ads may be played 405 on the audio source defined by the game developer. The impression tracker 405A may be obtained by parsing the VAST tags and the impression data 405B may be collected when a user receives the non-interrupting advertisements. The impression data 405B may include the events as described above indicative of user interaction with the audio ads and the impression data may be transmitted to the Demand Partner 403.

In some embodiments, the companion banner may also be displayed along with the audio ads. For example, companion banner may be displayed on a game object defined by the game developer. In some embodiments, if the audio ad is played, the game scene 406 may receive an ad type, an icon or banner ad dropdown menu if a banner is requested, and determine the banner size if the banner is requested.

After a game or application developer completes game or application development and/or insertion of the audio ads or other audio data to the game or application, the game or application may be compiled and update to a game or other marketplace. As described above, the game or application may be downloaded by a user from the marketplace. When the user plays the game or runs the application, an audio event (e.g., rewarded audio event) may be triggered which is defined by the game developer within the audio advertising SDK. In response to the trigger, a bid request with one or more SDK signals may be sent to the Demand Partner.

In some embodiments, the SDK provided herein may be integrated into a game in a convenient and seamless manner such as by: installing the SDK (e.g., C# plugin for the Unity engine); attaching one or more parameters to one or more game objects; and uploading the game to a game marketplace (e.g. Google Play, and Apple App Store). In some embodiments, the audio advertising SDK or audio advertising system may provide a graphical user interface (GUI) allowing game developers to insert the advertisements into a video game.

In some embodiments, the system may provide callbacks for error signaling or handling various events. For example, the advertising process may be returned when the Unity plugin cannot reach the Internet (e.g., no Internet connection), when no campaigns from the advertisers matching a bid request, when a requested banner size is not available, when an ad expires (e.g., after 20 minutes), when a user presses a skip ad button, or when the Unity plugin cannot find the native operation system volume plugins. Various other actions may also be performed by the system. For instance, when a requested banner size is not available, a placeholder image may be displayed or when an advertisement expires, a new ad request may be automatically generated.

Figure 6:
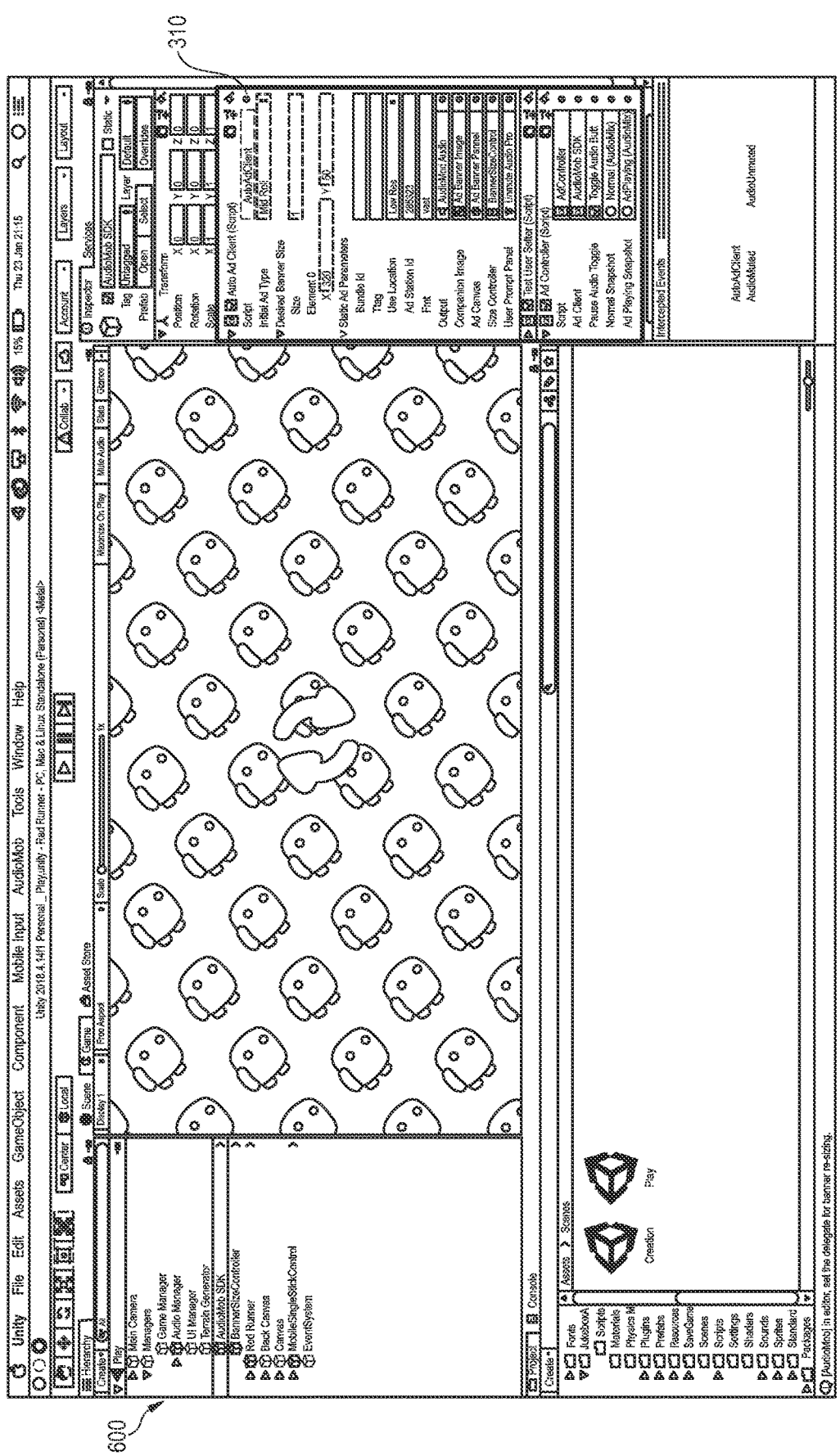
FIG. 6 shows an exemplary GUI for inserting audio ads or other audio data into a video game.

FIG. 6 shows an exemplary GUI 600 for inserting audio ads into a video game. As shown in the example, the audio advertising SDK 610 (e.g., C# plugin) is integrated to an existing game or application development software 600 (e.g., Unity engine) and a plurality of functional components such as rewarded audio trigger (e.g., attach parameters of game objects), sound output, companion banner object, unmute prompt and the like are provided via a panel 610. A developer may be permitted to design the audio advertisements via the interface panel 610. For instance, a developer may set up one or more placement preference such as set the initial Ad type as Mid Roll (e.g., mid-roll placement such that the content item is to be placed within feature content of the media item), the desired Banner size, Static Ad Parameters, User Prompt Panel (e.g., Unmute Audio Prompt) and various others via the panel 610. The GUI may show graphical elements or one or more interactive graphical elements that permit a user to interact with the audio ads or game objects and configure one or more SDK parameters. For example, the GUI may permit a user to set up a companion banner displayed on a selected game object or attach the one or more SDK parameters to one or more game objects.

FIG. 7 shows examples of SDK parameters, parameter types, and descriptions. As illustrated in FIG. 7, the SDK parameters may include, but not limited to, an Output SDK parameter, which is an audio source type, serves as an audio source for an audio ad; a Companion Image parameter, which is a rawimage type, serves as an audio companion image; a Size Controller parameter, which is a banner-sizecontroller type, controls the size of the companion banner; and a User Prompt Pane, which is a canvas type, which encourages the user to unmute if their game is currently muted. In some embodiments, the audio companion image is sent by an advertiser or the supplier of the audio data. In some embodiments, the companion banner has a preset dropdown. In some embodiments, the game developer selects the rewarded audio trigger, sound output, companion banner object, unmute prompt, or any combination thereof. Mobile Rich Media Ad Interface Definitions-Based Integration Method and System In alternative embodiments, the audio advertisements or other audio data can be integrated via a customized application programming interface (API). In some embodiments, proprietary Demand Side Platform (DSP) service may be created and provided allowing users (e.g., game developers) to trigger rewarded audio advertisements using the existing SDKs via Mobile Rich Media Ad Interface Definitions (MRAID).

The API may provide a uniform interface to various different applications incorporating different rich media vendor's SDKs. In some embodiments, the provided API may utilize Mobile Rich Media Ad Interface Definitions (MRAID). MRAID is an API that is to create rich media advertisements for mobile display. MRAID may allow developers to create rich media ads while controlling how the ads interact with the apps which the ads or other audio data are inserted. MRAID comprises a standardized set of commands designed to work with HTML5 and JavaScript, that developers use to communicate with each applications' native code which actions the advertisements perform. Such requirements ensure that compliant rich media advertisements can run within applications using any MRAID-compliant software development kit across a variety of publishers' mobile apps.

The present disclosure also provides integration methods and systems for game developers using Mobile Rich Media Ad Interface Definitions (MRAID), which allow game developers to maintain their current monetization SDKs (e.g. AdColony, Google Ad Manager, and Fyber, etc.). In some embodiments, the audio advertisements can be integrated via a customized application programming interface (API) that provides a uniform interface to various different applications incorporating different rich media vendor's SDKs. In some embodiments, the uniform API may utilize Mobile Rich Media Ad Interface Definitions (MRAID). The alternative implementation does not require the component described previously (i.e. the Unity plugin).

The uniform API may comprise various features such as providing non-interrupting audio ads or other audio data in standard format or rewarded format, automatic audibility measurement, providing companion banner and tracking events.

In some embodiments, the methods and systems presented herein may employ the MRAID 3.0 specification. In some embodiments, the ad container of MRAID 3.0 provides MRAID_ENV object which beneficially enables convenient verification of whether the container is MRAID-compliant and determines information about the environment (e.g., MRAID version, SDK version, Application ID and Identifier for Advertising). The audibility measurement capability of MRAID 3.0 also enables the methods and systems to detect or determine a sound volume or mute status (e.g., sound muted or volume change). In some embodiments, MRAID 3.0 further enables the determination of a location of a user's device when the advertisement is active.

Similar to the audio advertising SDK, the MRAID audio advertising platform permits an advertiser to create digital advertising campaigns and provide an audio creative in a format such as, for example, mp3, ogg or aac.

A developer may set a rewarded audio trigger event using an existing mobile SDK (e.g. AdColony, Google Ad Manager, Fyber). In some embodiments, once the user triggers a rewarded audio event predetermined by the game developer, the MRAID platform may start a bid on ad slots via the existing mobile existing SDK's bidding platform (e.g. Beeswax, Kayzen, etc.).

In some embodiments, an audio level is detected before sending a bid request to the bidder component of the MRAID audio advertising platform. Once an advertiser with the highest bid wins the auction, the bidder component may send the MRAID audio creative (e.g., wrapped mp3 from the advertiser). In some embodiments, MRAID audio creatives are generated by wrapping the original/standard audio creatives (e.g. mp3, ogg, aac) into MRAID tags. In some embodiments, once the audio creative has been played to the user, a ping is sent to the mobile SDK, and the user may be rewarded based on game developer settings (e.g. game item, new life, in game money). The MRAID audio advertising platform may also be capable of detecting an audio level to trigger one or more actions (e.g., user prompt to unmute). For example, a user may be prompted to unmute to receive rewarded audio if a mute volume level is detected. The MRAID script may interact with or be dependent on the SDK used to create the digital work (e.g. application or game). For example, the SDK may have access at device level to the device's audio functionality and the MRAID script may take advantage of this access directly or indirectly (e.g. by issuing instructions to do so).

Figure 8:
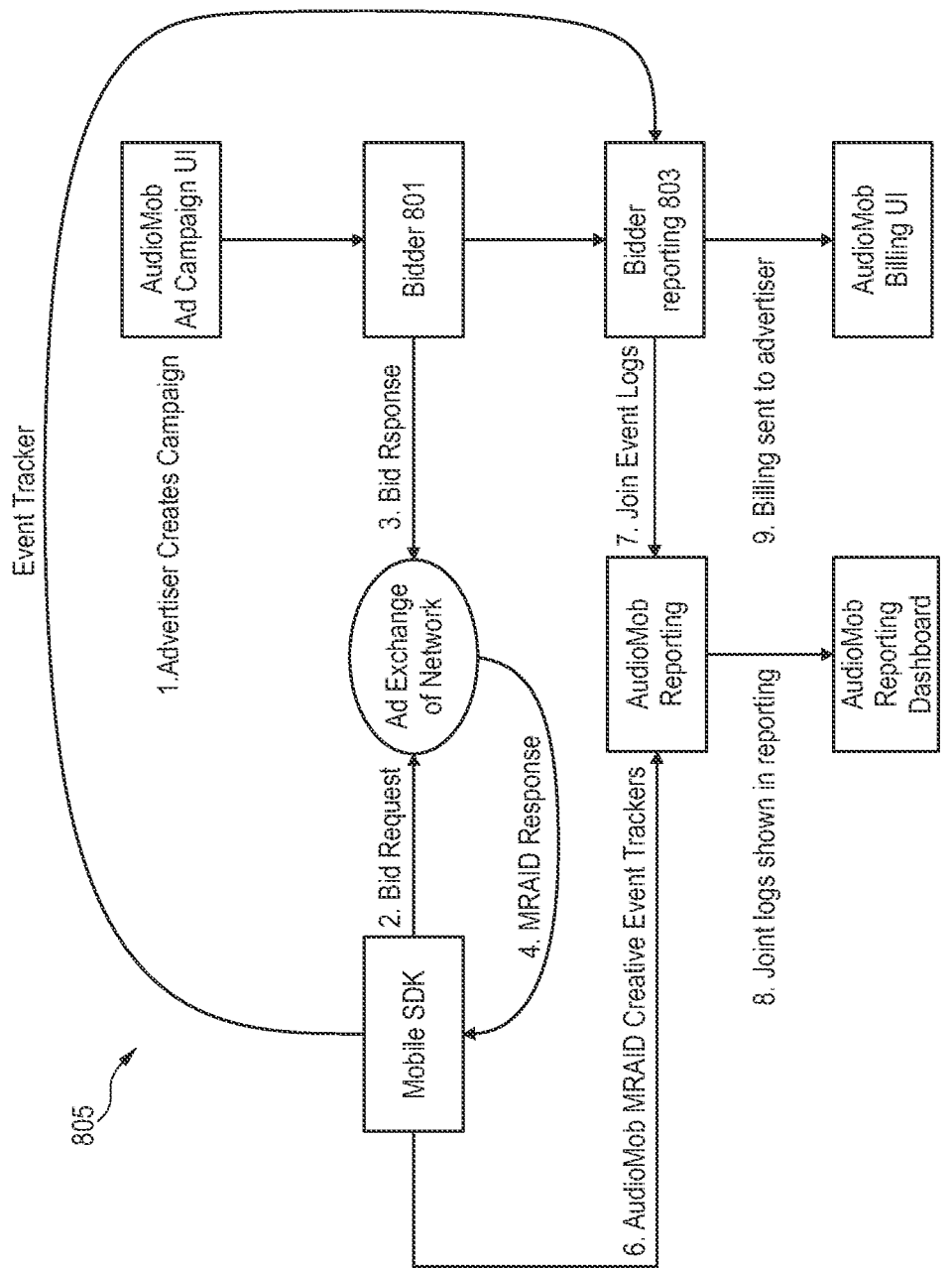
FIG. 8 schematically illustrates a flow of providing non-interrupting advertising or other audio data, in accordance with some embodiments of the present disclosure.

FIG. 8 schematically illustrates a flow 805 of providing non-interrupting advertising, in accordance with some embodiments of the present disclosure. In the illustrated example, an advertiser may create digital advertising campaigns on the provided audio platform. For instance, a user may create an Ad campaign via a user interface of the DSP by uploading audio creatives (e.g. mp3, ogg, aac). Game developers may user their existing mobile SDK (e.g., Google Ad Manager, Fyber, etc) to set a rewarded audio trigger event within the existing mobile SDK. When a user plays a game and triggers an audio event set by the game developer, a bid request with rewarded audio signals may be sent by the existing mobile SDK to the bidder 801 provided by the platform (e.g., 3rd Party Bidder). The bidder 801 may bid on MRAID ad slots with the rewarded audio signals. Advertiser with the highest bid from the bidder wins the auction and sends MRAID creatives (e.g., wrapped mp3 from the advertiser) as the bid or MRAID response. Ping is sent to the mobile SDK after the audio creative is played. Users may then be rewarded based on the game developer's settings. The bidding reporting component 803 may send the event logs to the platform's reporting component and a billing component of the platform (e.g., billing user interface). The reporting component may assemble information received from the bidder reporting component 803 and event trackers received from the mobile SDK and send the information to the reporting dashboard.

Figure 9:
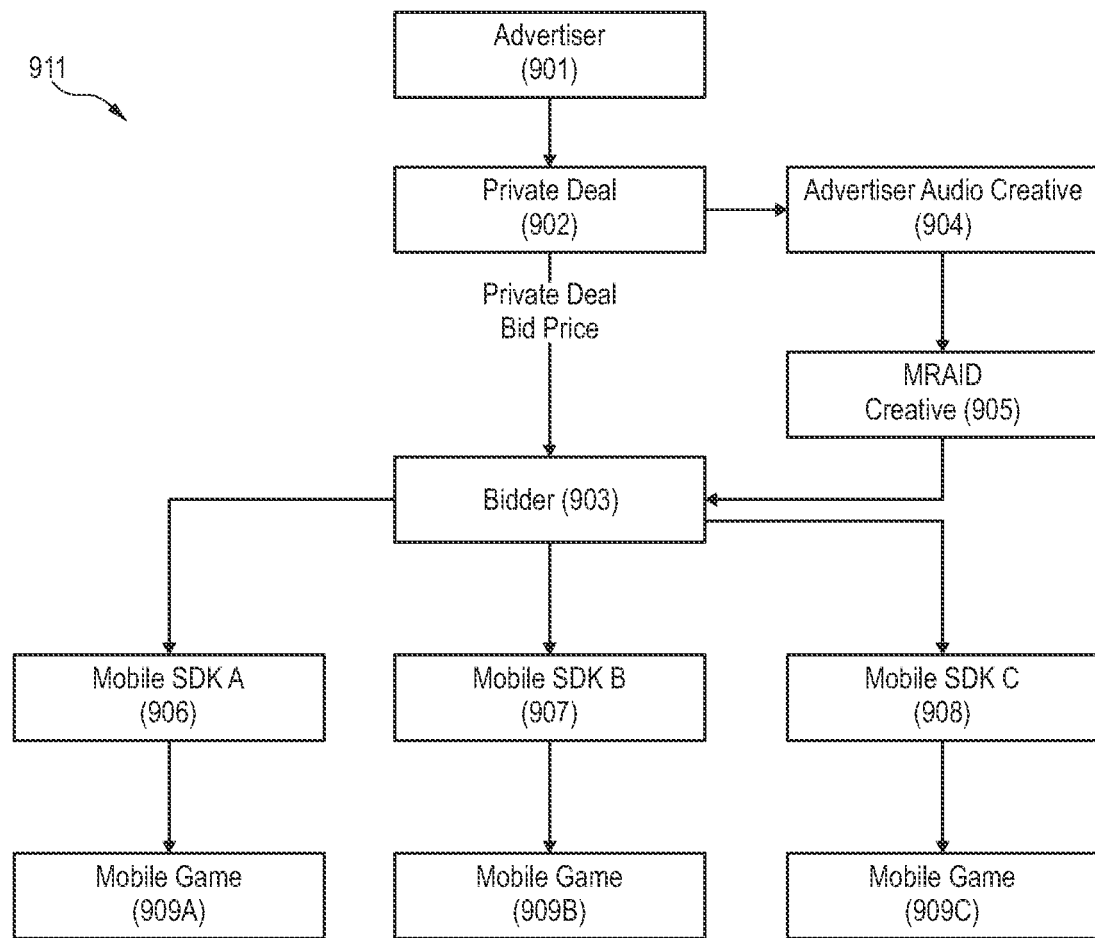
FIG. 9 shows another non-limiting exemplary diagram of a Real Time Bidding (RTB) demand integration.

FIG. 9 shows another non-limiting exemplary diagram 911 of a Real Time Bidding (RTB) demand integration. As shown, an advertiser 901 may send a private deal 902 (e.g., advertising campaign) to the bidder component 903 of the MRAID audio advertising platform. The private deal may include at least data about an advertising campaign such as a private deal bid price, start date, an end date, budget information, targeting information, syndication information and an advertiser audio creative 904. The advertiser audio creative 904 may be wrapped into MRAID tags to form MRAID creative 905 and transmitted to the bidder component 903. The bidder component 903 may send bids to one or more existing mobile SDKs, such as mobile SDK A 906 (e.g., Google Ad Manager) for a first mobile game 909A, a second mobile SDK 907 for a second mobile game 908B, and to a third mobile SDK 908 (e.g., Unity Ads) for a third mobile game 908C.

Figure 9A:
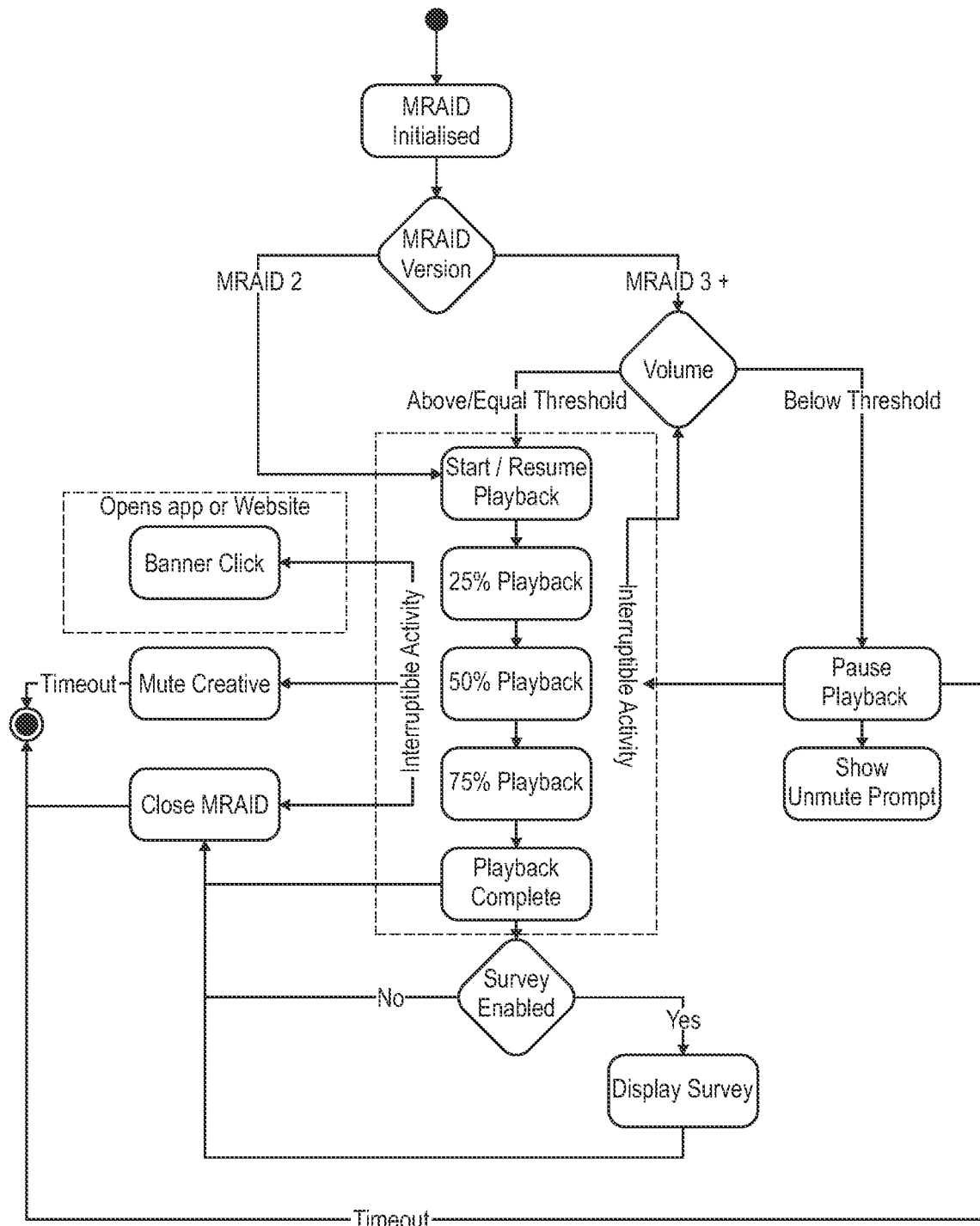
FIG. 9A shows a schematic state diagram of a system for requesting, providing and monitoring audio data.

MRAID parameters may include any one or more of:
Autoplay (Boolean): Whether or not the creative plays automatically
close_button (Boolean): Whether or not the close button is displayed
audio_icon (Boolean): Whether or not the mute button is displayed
audio (String): URL to the creative audio file
banner (String): URL to the companion banner file
click (String): URL to the creative destination page
aid (String): The auction ID for a particular impression FIG. 9A shows a state diagram of the functionality used to manage and monitor playback of the audio data on the device during rending of the digital work. In this alternative example implementation, computer readable instructions (e.g. in the MRAID format) are sent with the response to the request for the audio data and so accompanies the received audio data. These received computer implemented instructions carry out some or all of the functionality that was described with reference to the component, plugin or Unity plugin previously described.

Different MRAID versions have different functionality. The MRAID version is detected during this process. For MRAID 3 or above, similar volume detection to that described previously with respect to the Unity plugin example implementation may be carried out with the same threshold comparisons made to the current device volume level and unmute prompts being displayed, where appropriate.

Earlier MRAID versions can be used to implement computer readable instructions to monitor how much of the audio data is played back before a skip or abort command is issued (or if the audio data is played back in full). Again, this is carried out in a similar way to that described with reference to the component or Unity plugin example implementation. Where an interactive visual element or banner is sent with the audio data (and MRAID data), then any user interaction (e.g. clicks) is monitored, recorded and sent back to a server for analysis. The user may also receive a survey request. This can ask the user to rate the received audio data (e.g. advertisement). For example, the user can rate the audio data (e.g. advertisement) and answer questions defined by the audio content provider (e.g. advertiser). This information can be returned to the DSP and used in future selections of audio data sent to the user or groups of users.

Figure 9B:
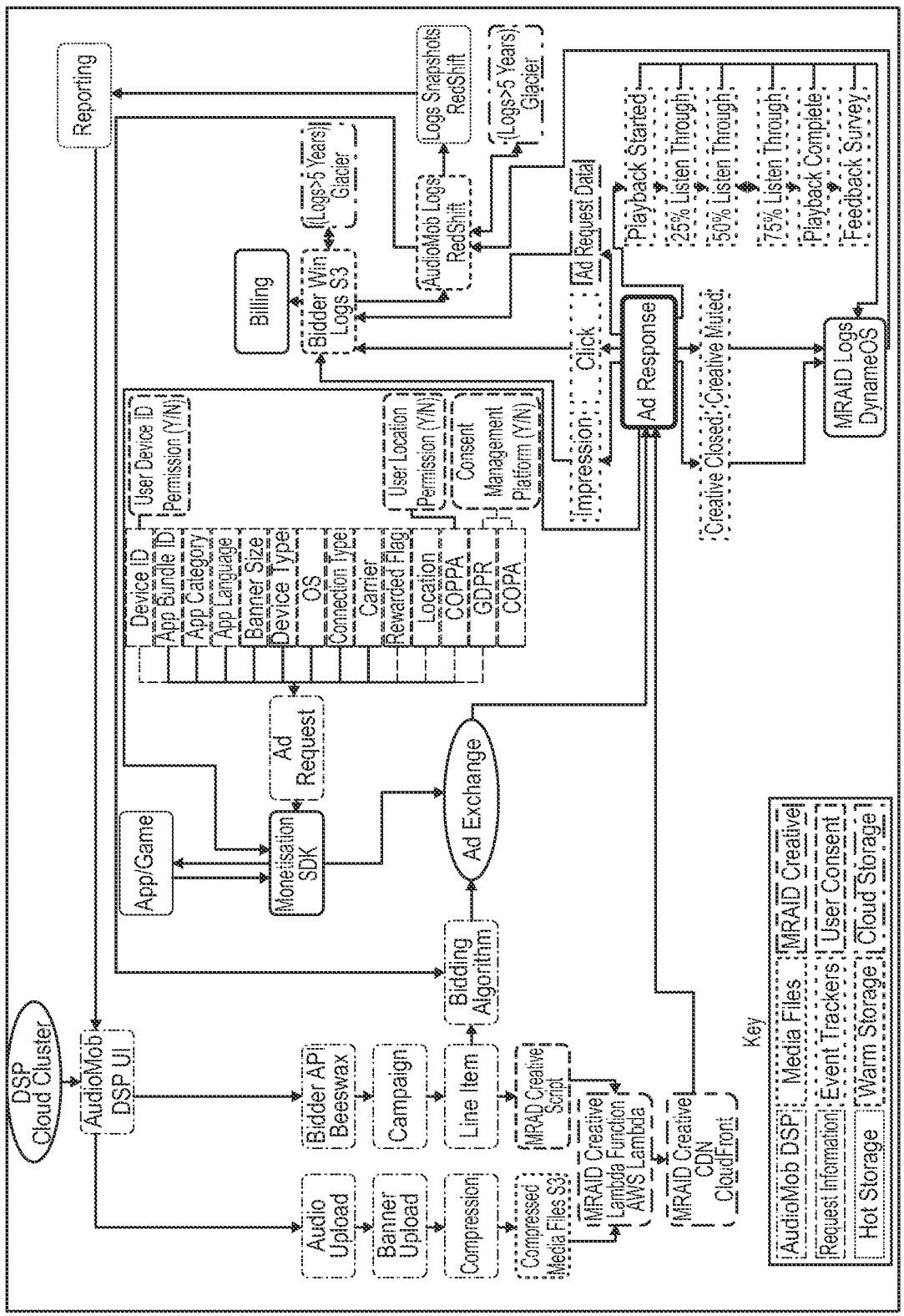
FIG. 9B shows a schematic diagram of a system for requesting, providing and monitoring audio data.

FIG. 9B shows a schematic diagram of the system and functions used to implement the SDK, DSP and MRAID example implementation. The DSP user interface (UI) is shown interacting with bidding functionality and a function to add audio data (ultimately sent to devices). The DSP UI (e.g. AudioMob DSP UI) enables the computer readable instructions to be defined within the MRAID script and stored with the audio data (preferably in compressed form). These data may be stored in a cloud server or elsewhere.

In a similar way to that described with reference to the Unity plugin examples, the SDK definition causes the digital work (e.g. application or game) to formulate a request for audio data (e.g. an ad request). Again, the request may include additional parameters that may or may not require user permission. If permission is granted then the parameters are sent with the request.

The computer readable instructions (MRAID) that are sent with the audio data (e.g. ad or other audio) and that cause current audio playback to be suspended, also monitors playback amount (e.g. percentage thresholds reached) and any interaction with visual data (clicks on banner, etc.) and reports back to a receiving entity for logging. This generates reports that are sent to the DSP UI. These logs may also be used for billing purposes when the audio data is an advertisement. The computer readable instructions (MRAID) may also implement any interaction (e.g. rewarded) with the digital work (e.g. application or game). The computer readable instruction (MRAID) control of the current audio playback on the device may be dependant on the SDK that is used to serve the received audio data.

Computing System

Figure 10:
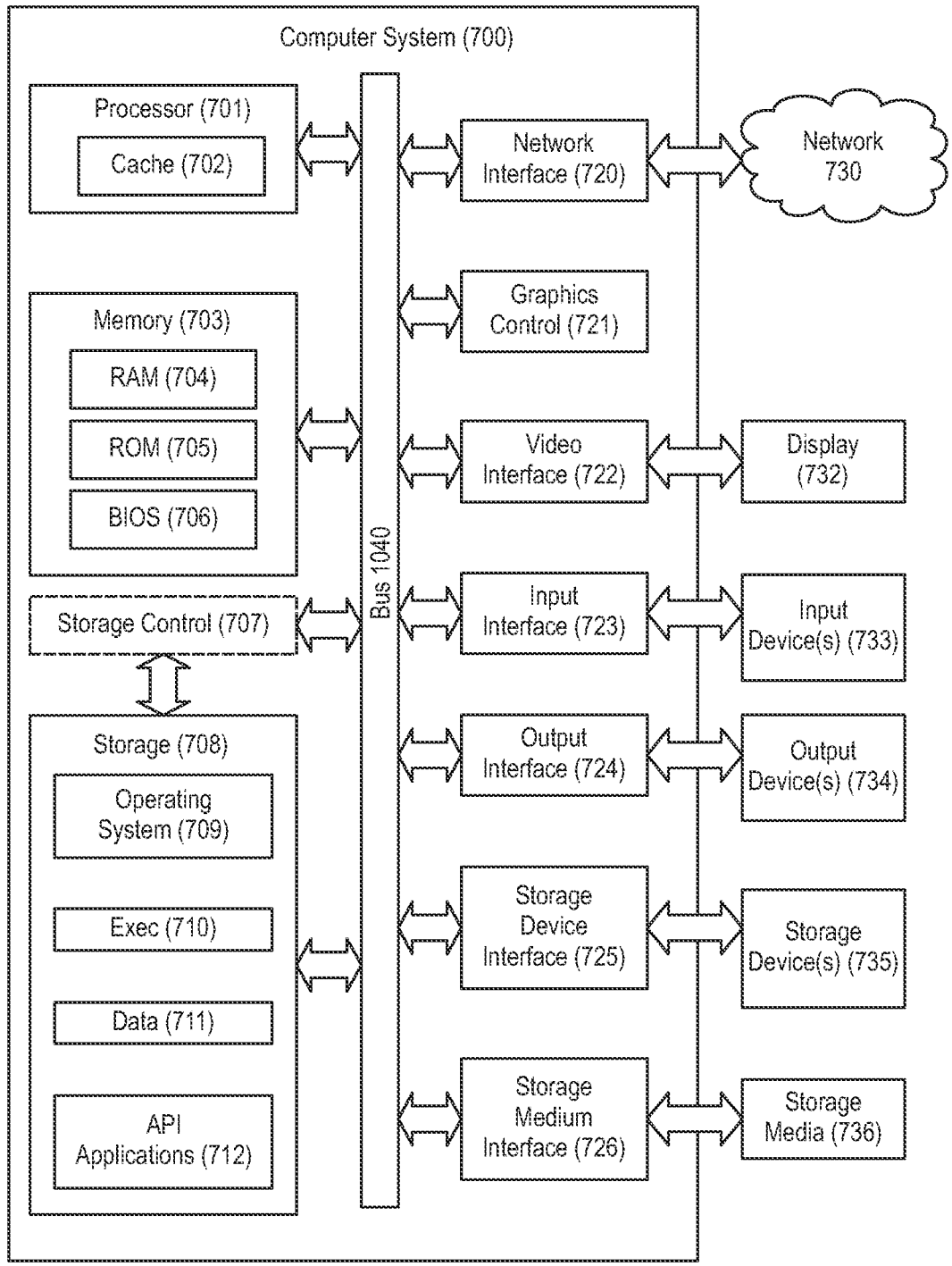
FIG. 10 shows a block diagram depicting an exemplary machine that implements the methods and systems described herein.

Referring to FIG. 10, a block diagram is shown depicting an exemplary machine that includes a computer system 700 (e.g., a processing or computing system) within which a set of instructions can execute for causing a device to perform or execute any one or more of the aspects and/or methodologies for static code scheduling of the present disclosure. The components in FIG. 10 are examples only and do not limit the scope of use or functionality of any hardware, software, embedded logic component, or a combination of two or more such components implementing particular embodiments.

Computer system 700 may include one or more processors 701, a memory 703, and a storage 708 that communicate with each other, and with other components, via a bus 740. The bus 740 may also link a display 732, one or more input devices 733 (which may, for example, include a keypad, a keyboard, a mouse, a stylus, etc.), one or more output devices 734, one or more storage devices 735, and various tangible storage media 736. All of these elements may interface directly or via one or more interfaces or adaptors to the bus 740. For instance, the various tangible storage media 736 can interface with the bus 740 via storage medium interface 726. Computer system 700 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 700 includes one or more processor(s) 701 (e.g., central processing units (CPUs) or general purpose graphics processing units (GPGPUs)) that carry out functions. Processor(s) 701 optionally contains a cache memory unit 702 for temporary local storage of instructions, data, or computer addresses. Processor(s) 701 are configured to assist in execution of computer readable instructions. Computer system 700 may provide functionality for the components depicted in FIG. 7 as a result of the processor(s) 701 executing non-transitory, processor-executable instructions embodied in one or more tangible computer-readable storage media, such as memory 703, storage 708, storage devices 735, and/or storage medium 736. The computer-readable media may store software that implements particular embodiments, and processor(s) 701 may execute the software. Memory 703 may read the software from one or more other computer-readable media (such as mass storage device(s) 735, 736) or from one or more other sources through a suitable interface, such as network interface 720. The software may cause processor(s) 701 to carry out one or more processes or one or more steps of one or more processes described or illustrated herein. Carrying out such processes or steps may include defining data structures stored in memory 703 and modifying the data structures as directed by the software.

The memory 703 may include various components (e.g., machine readable media) including, but not limited to, a random access memory component (e.g., RAM 704) (e.g., static RAM (SRAM), dynamic RAM (DRAM), ferroelectric random access memory (FRAM), phase-change random access memory (PRAM), etc.), a read-only memory component (e.g., ROM 705), and any combinations thereof. ROM 705 may act to communicate data and instructions unidirectionally to processor(s) 701, and RAM 704 may act to communicate data and instructions bidirectionally with processor(s) 701. ROM 705 and RAM 704 may include any suitable tangible computer-readable media described below. In one example, a basic input/output system 706 (BIOS), including basic routines that help to transfer information between elements within computer system 700, such as during start-up, may be stored in the memory 703.

Fixed storage 708 is connected bidirectionally to processor(s) 701, optionally through storage control unit 707. Fixed storage 708 provides additional data storage capacity and may also include any suitable tangible computer-readable media described herein. Storage 708 may be used to store operating system 709, executable(s) 710, data 711, applications 712 (application programs), and the like. Storage 708 can also include an optical disk drive, a solid-state memory device (e.g., flash-based systems), or a combination of any of the above. Information in storage 708 may, in appropriate cases, be incorporated as virtual memory in memory 703.

In one example, storage device(s) 735 may be removably interfaced with computer system 700 (e.g., via an external port connector (not shown)) via a storage device interface 725. Particularly, storage device(s) 735 and an associated machine-readable medium may provide non-volatile and/or volatile storage of machine-readable instructions, data structures, program modules, and/or other data for the computer system 700. In one example, software may reside, completely or partially, within a machine-readable medium on storage device(s) 735. In another example, software may reside, completely or partially, within processor(s) 701.

Bus 740 connects a wide variety of subsystems. Herein, reference to a bus may encompass one or more digital signal lines serving a common function, where appropriate. Bus 740 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 700 may also include an input device 733. In one example, a user of computer system 700 may enter commands and/or other information into computer system 700 via input device(s) 733. Examples of an input device(s) 733 include, but are not limited to, an alphanumeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 733 may be interfaced to bus 740 via any of a variety of input interfaces 723 (e.g., input interface 723) including, but not limited to, serial, parallel, game port, USB, FIREWIRE, THUNDERBOLT, or any combination of the above.

In particular embodiments, when computer system 700 is connected to network 730, computer system 700 may communicate with other devices, specifically mobile devices and enterprise systems, distributed computing systems, cloud storage systems, cloud computing systems, and the like, connected to network 730. Communications to and from computer system 700 may be sent through network interface 720. For example, network interface 720 may receive incoming communications (such as requests or responses from other devices) in the form of one or more packets (such as Internet Protocol (IP) packets) from network 730, and computer system 700 may store the incoming communications in memory 703 for processing. Computer system 700 may similarly store outgoing communications (such as requests or responses to other devices) in the form of one or more packets in memory 703 and communicated to network 730 from network interface 720. Processor(s) 701 may access these communication packets stored in memory 703 for processing.

Examples of the network interface 720 include, but are not limited to, a network interface card, a modem, and any combination thereof. Examples of a network 730 or network segment 730 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 730, may employ a wired and/or a wireless mode of communication. In general, any network topology may be used.

Information and data can be displayed through a display 732. Examples of a display 732 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMO-LED) display, a plasma display, and any combinations thereof. The display 732 can interface to the processor(s) 701, memory 703, and fixed storage 708, as well as other devices, such as input device(s) 733, via the bus 740. The display 732 is linked to the bus 740 via a video interface 722, and transport of data between the display 732 and the bus 740 can be controlled via the graphics control 721. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 732, computer system 700 may include one or more other peripheral output devices 734 including, but not limited to, an audio speaker, a printer, a storage device, and any combinations thereof. Such peripheral output devices may be connected to the bus 740 via an output interface 724. Examples of an output interface 724 include, but are not limited to, a serial port, a parallel connection, a USB port, a FIREWIRE port, a THUNDER-BOLT port, and any combinations thereof.

In addition, or as an alternative, computer system 700 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will also recognize that select televisions, video players, and digital music players with optional computer network connectivity are suitable for use in the system described herein. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 11:
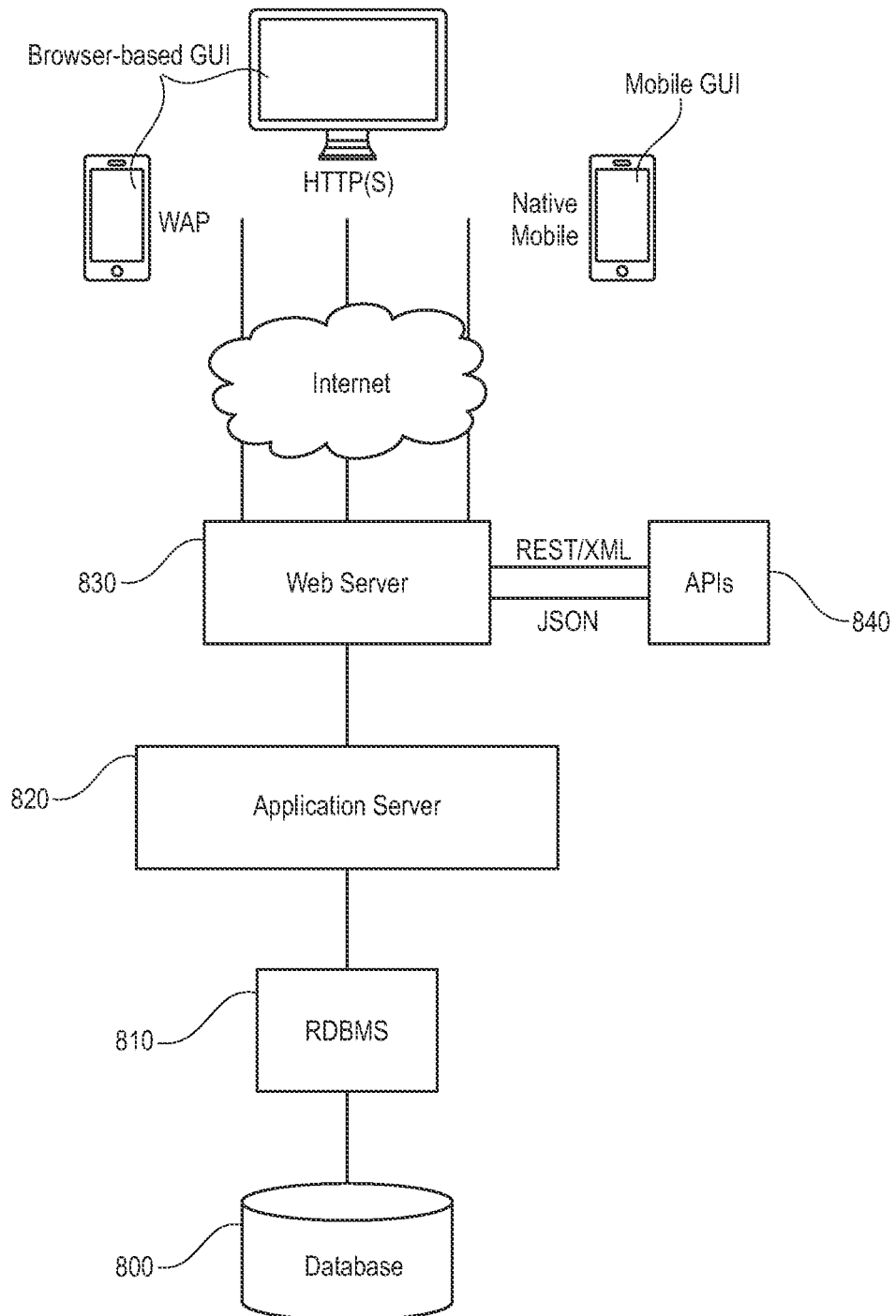
FIG. 11 shows a non-limiting example of a web/mobile application provision system.

Referring to FIG. 11, in a particular embodiment, an application provision system comprises one or more databases 800 accessed by a relational database management system (RDBMS) 810. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 820 (such as Java servers, .NET servers, PHP servers, and the like) and one or more web servers 830 (such as Apache, IIS, GWS and the like). The web server(s) optionally expose one or more web services via app application programming interfaces (APIs) 840. Via a network, such as the Internet, the system provides browser-based and/or mobile native user interfaces.

Figure 12:
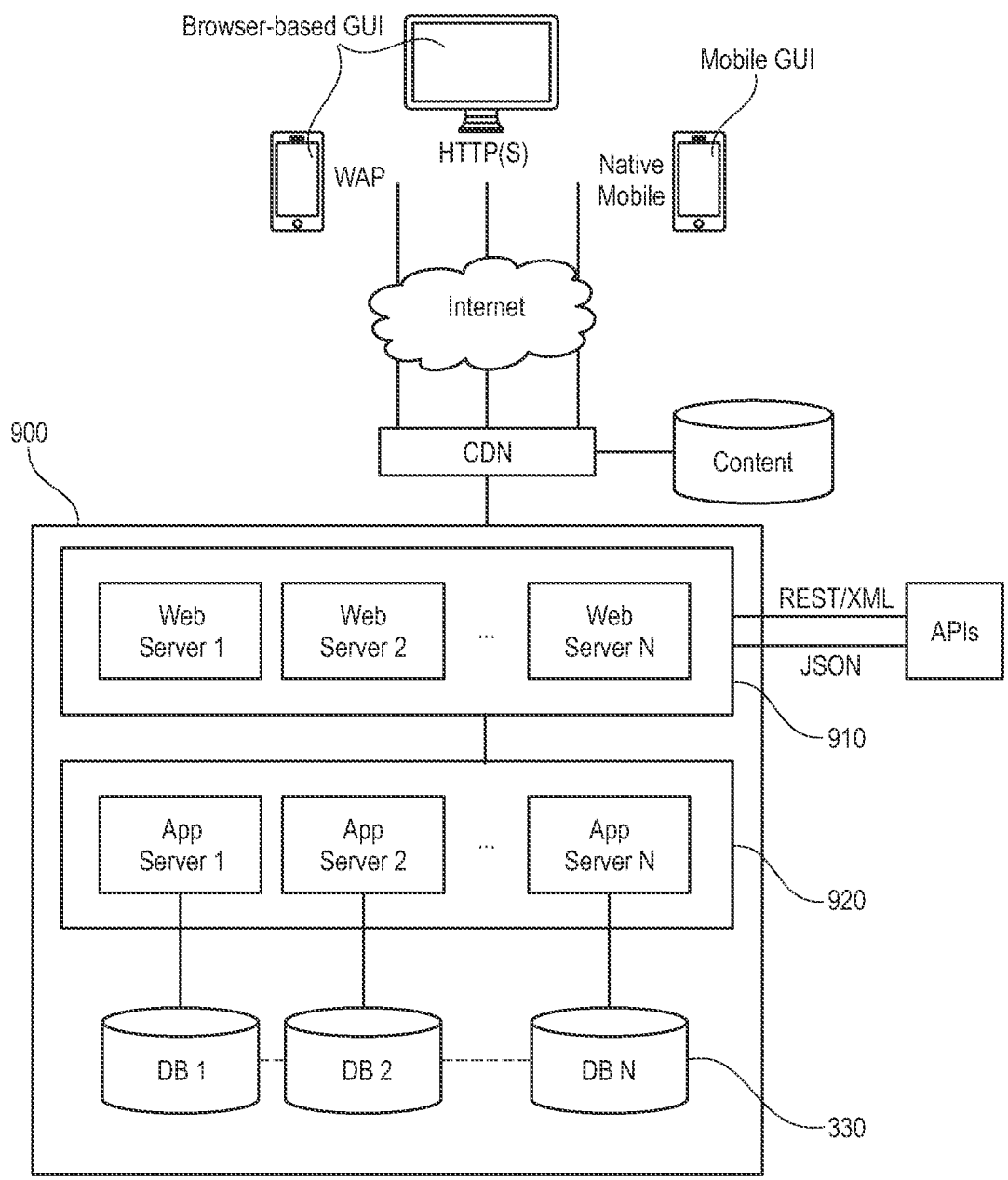
FIG. 12 shows a non-limiting example of a cloud-based web/mobile application provision system.

Referring to FIG. 12, in a particular embodiment, an application provision system alternatively has a distributed, cloud-based architecture 900 and comprises elastically load balanced, auto-scaling web server resources 910 and application server resources 920 as well synchronously replicated databases 930.

In some embodiments, one or more systems or components of the present disclosure are implemented as a containerized application (e.g., application container or service containers). The application container provides tooling for applications and batch processing such as web servers with Python or Ruby, JVMs, or even Hadoop or HPC tooling. Application containers are what developers are trying to move into production or onto a cluster to meet the needs of the business. Methods and systems of the invention will be described with reference to embodiments where container-based virtualization (containers) is used. The methods and systems can be implemented in application provided by any type of systems (e.g., containerized application, unikernel adapted application, operating-system-level virtualization or machine level virtualization).

Figure 13:
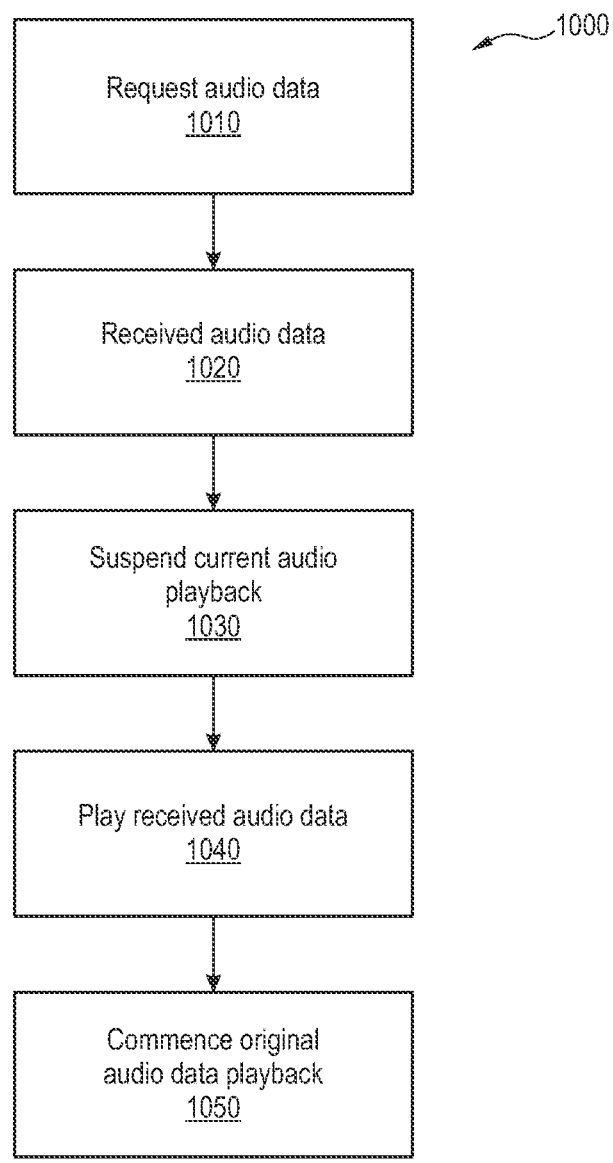
FIG. 13 shows a flowchart of a method for providing audio data.

FIG. 13 shows a flow chart of the high-level steps for a method 1000 for providing additional audio data to be played back on a device. At step 1010, a request for audio data is issued. This request may originate from the component (e.g. Unity plugin) within the digital work or in other example implementations, the request may be defined elsewhere. For example, this may be a request for content (e.g. an ad request) from the digital work (e.g. game) generated by the SDK implementation of the digital work. In any case, the request and response may be sent over the internet or other network, for example. At step 1020, the device receives the audio data, as described previously.

At step 1030, any audio currently being played back on the device (e.g. game sound or a music track) is suspended. This may be managed and initiated from the component or from computer readable instructions (e.g. in the MRAID format) received with the audio data. The reduction of system sound volume (or its ceasing), e.g. music, game or other audio, initially being played on the device may be manually programmed by developers of the digital content (e.g. games) or automatically achieved by the system. The received audio data is played on the device whilst the digital work (e.g. game) continues at step 1040.

Once the audio track stops (e.g. stopped by the user or comes to its end) then the audio that was playing on the device before resumes playback (step 1050).

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-in

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected computing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile computing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, Google® Chrome®, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of digital media, advertising, and game information. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In a particular embodiment, a database is a distributed database. In other embodiments, a database is based on one or more local computer storage devices.

The systems and methods described enable developers of mobile applications and games to more easily introduce third-party audio without disrupting the user interaction with those mobile applications and games. In some implementations, this enables games, in particular, to receive audio advertisements and other content more seamlessly.

In particular implementations, rewarded advertisements can be provided also without interrupting game play or user interactions with mobile applications but the system and methods also allow audio to be created even after mobile applications and games have been deployed yet still be included and played on installed applications on devices. The system also enables interactions to occur with this additional material even after the mobile applications and games have been installed.

The following numbered clauses provide further illustrative examples:

1. A system for providing non-intrusive advertisements in a video content comprising:
   a memory for storing a set of instructions; and
   one or more processors configured to execute the set of instructions to:
     provide a graphical user interface (GUI) for editing one or more parameters of an audio advertisement and insert the audio advertisement into the video content;
     detect an audio level of a user device upon receiving a triggering event while the user is interacting with the video content using the user device; and
     in response to the detected audio level, generate a rewarded audio advertisement, wherein the rewarded audio advertisement is played to the user without interrupting the user interacting with the video content.

2. The system of clause 1, wherein when the audio level is zero or below a predetermined threshold, a notification is generated indicating a rewarded audio advertisement is available.

As will be appreciated by the skilled person, details of the above embodiment may be varied without departing from the scope of the present invention, as defined by the appended claims.

For example, where the audio data is not advertising audio data then auction or bidding functionality is not necessarily required. Nevertheless, the component, plugin or Unity plugin may still be used to request the audio data and may optionally coordinate and report any monitoring data that it collects (i.e. according to the steps described previously). Furthermore, the DSP or MRAID example implementations may also be used with audio data that is not necessarily advertising audio data and again, the auction or bidding functionality may not be required. The computer implemented instructions that accompany the received audio data may include different scripting languages (e.g. JavaScript). JavaScript may also implement the tracking events, for example.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A method for playing audio on a device, the method comprising the steps of:
   rendering a digital work on the device;
   a component of the digital work initiating a request for audio data during the rendering of the digital work, the digital work including video data and first audio data;
   in response to the request, the component of the digital work receiving the audio data as an audio file from a server which is external to the device;
   while continuing the rendering of the digital work on the device with the video data of the digital work unaffected, the component of the digital work suspending playback of the first audio data currently playing on the device and playing the received audio data on the device, wherein when a detected volume output level is below a predetermined non-zero threshold then preventing playback of the received audio data until the device volume output level is detected at or above the predetermined non-zero threshold; and
   when the received audio data stops playing continuing with the rendering of the digital work on the device and the component of the digital work resuming playback of the first audio data previously playing on the device.

2. The method of claim 1, wherein the digital work is an interactive digital work.

3. The method of claim 2, wherein the interactive digital work is a game, mobile application, or web page.

4. The method of claim 1 further comprising the step of:
following playback of the received audio data, changing one or more parameters within the interactive digital work.

5. The method of claim 4, wherein the one or more parameters alters a user interaction with the interactive digital work.

6. The method of claim 1, wherein the component of the digital work initiating the request is a software plug-in.

7. The method of claim 1 further comprising the steps of:
receiving a user command to stop playback of the received user data; and
in response resuming playback of the audio data of the digital work in place of the received audio data.

8. The method of claim 1 further comprising the steps of:
monitoring how much of the audio data has been played back; and
reporting the monitored playback amount.

9. The method of claim 8, wherein the component carries out the monitoring and reporting steps.

10. The method of claim 1 further comprising the steps of:
the server receiving the request for audio data;
the server preparing a further request based on request parameters;
the server issuing the further request and receiving in response the audio data; and
the server sending the audio data to the mobile device.

11. The method of claim 1 further comprising the steps of:
the device receiving visual data with the audio data; and
displaying on a display of the device, the visual data together with the video data of the digital work.

12. The method of claim 11, wherein the visual data includes user interaction functionality.

13. The method of claim 12 further comprising the step of sending a report of user interaction with the visual data user interaction functionality.

14. One or more non-transitory computer readable media storing computer executable instructions which, when executed, configure a computing system to perform:
rendering a digital work on the device;
initiating, by a component of the digital work, a request for audio data during the rendering of the digital work, the digital work including video data and first audio data;
receiving, by the component of the digital work, the audio data in response to the request as an audio file from a server which is external to the device;
while continuing the rendering of the digital work on the system with the video data of the digital work unaffected, the component of the digital work suspending playback of the first audio data currently playing on the system and playing the received audio data on the system, wherein when a detected volume output level is below a predetermined non-zero threshold then preventing playback of the received audio data until the device volume output level is detected at or above the predetermined non-zero threshold; and
when the received audio data stops playing continuing with the rendering of the digital work on the system and the component of the digital work resuming playback of the first audio data previously playing on the system.

15. A system comprising:
A mobile device comprising:
a display;
a processor; and
memory storing executable instructions which, when executed by the processor, configure the mobile device to perform:
rendering a digital work on the device;
initiating, by a component of the digital work, a request for audio data during the rendering of the digital work, the digital work including video data and first audio data;
receiving, by the component of the digital work and from a server which is external to the mobile device, the audio data in response to the request;
while continuing the rendering of the digital work on the device with the video data of the digital work unaffected, the component of the digital work suspending playback of the first audio data currently playing on the device and playing the received audio data on the device, wherein when a detected volume output level is below a predetermined non-zero threshold then preventing playback of the received audio data until the device volume output level is detected at or above the predetermined non-zero threshold; and
when the received audio data stops playing continuing with the rendering of the digital work on the device and the component of the digital work resuming playback of the first audio data previously playing on the device.

16. The system of claim 15, further comprising:
a server configured to:
receive the request for audio data;
prepare a further request based on request parameters;
issue the further request and receiving in response the audio data; and
send the audio data to the mobile device.

* * * * *